(12) United States Patent
Kamoi et al.

(10) Patent No.: US 6,437,515 B1
(45) Date of Patent: Aug. 20, 2002

(54) DISCHARGE LAMP LIGHTING DEVICE OF HIGH STARTABILITY WITH HIGH PULSE VOLTAGE

(75) Inventors: Takeshi Kamoi, Kyoto; Naoki Komatsu, Osaka; Tsutomu Shiomi, Nara; Hiroichi Shinbori, Hyogo, all of (JP); Takeshi Goriki, Burlington; Yiyoung Sun, Beverly, both of MA (US)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/484,005

(22) Filed: Jan. 18, 2000

(51) Int. Cl.[7] ............................................... H05B 37/02
(52) U.S. Cl. .................... 315/209 R; 315/224; 315/307; 315/308
(58) Field of Search .............................. 315/209 R, 224, 315/307, 308

(56) References Cited

U.S. PATENT DOCUMENTS 4,346,332 A * 8/1982 Walden ....................... 315/307
5,491,388 A * 2/1996 Nobuyuki et al. .......... 315/308

FOREIGN PATENT DOCUMENTS

JP            63-150895         12/1986

* cited by examiner

Primary Examiner—David Vu
(74) Attorney, Agent, or Firm—Lynn & Lynn

(57) ABSTRACT

A discharge lamp lighting device which comprises a D.C. power supply, a load resonance circuit including an inductor, a capacitor and a discharge lamp; a polarity inverting circuit including at least a series circuit of first and second switching elements connected in parallel to the D.C. power supply for converting a D.C. power received from the D.C. power supply into an A.C. power to supply it to the load resonance circuit; and a control circuit for turning ON and OFF the switching elements alternately at a high frequency to alternately generate a first period during which an ON duration of the second switching element is longer than that of the first switching element and a second period during which the ON duration of the second switching element is shorter than that of the first switching element, to thereby apply a rectangular-shaped low frequency voltage to the discharge lamp. The control circuit superimposes a D.C. component in an output of the polarity inverting circuit upon a resonance pulse signal from the load resonance circuit to continuously change a switching frequency of the switching elements for the predetermined time from the start time point of one of the first and second periods, and supplies to the discharge lamp a first energy necessary for starting and lighting the discharge lamp with a high pulse voltage obtained through LC resonance and also for smoothly shifting the lamp to an arc discharge state.

23 Claims, 17 Drawing Sheets

DISCHARGE LAMP LIGHTING DEVICE OF HIGH STARTABILITY WITH HIGH PULSE VOLTAGE

BACKGROUND OF THE INVENTION

The present invention relates generally to discharge lamp lighting devices which can have a high start performance and more particularly, to a discharge lamp lighting device which can improve a start performance of a high-intensity discharge lamp (HID lamp) and reduce stresses in constituent parts of the lamp.

DESCRIPTION OF RELATED ART

A prior art discharge lamp lighting device disclosed, for example, in Japanese Patent Application Laid-Open Publication No. 63-150895, comprises first and second transistors for high frequency operation, a third and fourth transistors for low frequency operation, a control circuit for controlling ON/OFF operation of the first to fourth transistors, and an ignitor for generating a high pulse voltage, a rectangular-wave shaped A.C. voltage having polarities inverted at intervals of a constant time being applied to a discharge lamp.

The control circuit in the aforementioned device includes first and second comparators to which reference voltages Vr1 and Vr2 are applied, an oscillation circuit for oscillating a clock signal having a predetermined frequency set by a time-constant circuit of a capacitor and a resistance, a first flip-flop inverted by outputs of the comparators, a timer circuit for outputting a pulse signal having a constant period, and a drive circuit for generating a control signal for two pairs of transistors on the basis of an output (high frequency signal fh) of the flip-flop and an output (low frequency signal fl) of the timer circuit.

The drive circuit includes a second flip-flop, first to fourth AND circuits, fifth and sixth transistors, and first and second pulse transformers.

The ignitor, which includes a bi-directional 3-terminal thyristor (triac), a bi-directional 2-terminal switch (switch) and a third pulse transformer, is arranged so that, at the time of starting the discharge lamp, turning ON and OFF of the triac causes a starting high pulse voltage induced in a secondary winding of the third pulse transformer to be applied to the discharge lamp.

Explanation will be made as to the operation of the above discharge lamp lighting device. An output of the oscillation circuit is compared by the second comparator with the second reference voltage Vr2. When the oscillation circuit output is larger than the second reference voltage, the second comparator produces a high level output, the first flip-flop is set and produces a high level output. From this time moment, any one of the first and third transistors is turned ON so that a current flows therethrough and a voltage Vdt corresponding to the voltage appears between both ends of a current detection resistance. The voltage Vdt is compared by the first comparator with the reference voltage Vr1. When Vdt>Vr1, the output of the first comparator is changed to its high level to reset the first flip-flop.

The high frequency signal fh issued from the first flip-flop is applied to the drive circuit as a timing signal for the high frequency switching operation. The low frequency signal fl issued from the timer circuit, on the other hand, is applied to the drive circuit as a timing signal for the low frequency switching operation and is set to have a frequency corresponding to twice its polarity inverting frequency.

The drive circuit frequency-divides the low frequency signal fl by the second flip-flop and third and fourth AND circuits to form an ON control signal for the third and fourth transistors and outputs the signal. The drive circuit also sets the outputs of the first and second AND circuits suitably at high levels on the basis of the high frequency signal fh, and outputs an ON/OFF control signal for the first and second transistors through the fifth and sixth transistors and second and third pulse transformers. Accordingly an A.C. voltage, which is supplied from an inverter of a full bridge type and applied to the discharge lamp via the inductor, is a voltage a polarity of which is inverted at intervals of a constant time and which is chopped at a high frequency.

The ignitor is arranged so that a second capacitor is already charged before its polarity inversion, a third capacitor is already charged through the resistance after the polarity inversion, and the triac is made conductive depending on a time constant determined by the first and second resistances and a fourth capacitor. That is, when a voltage across the fourth capacitor reaches a switch response voltage, the switch is made conductive to trigger the triac. When the triac is made conductive in this manner, the second and third capacitors are connected in series so that electric charges so far accumulated in the capacitors are discharged through the primary winding of the first transformer and a starting high pulse voltage is generated in the secondary winding thereof to be applied to the discharge lamp.

Such a prior art discharge lamp lighting device as mentioned above, however, has had a problem that the polarity inversion period of the A.C. voltage applied to the discharge lamp in the lamp start mode (discharge start mode) is equal to that in the stationary lighted mode (switching frequency of 100 to 200 Hz), so that, even when the high pulse voltage is applied to start the discharge lamp in the start mode, its inverted polarity voltage is immediately applied to the discharge lamp, which undesirably results in that it is hard for the lamp to maintain the discharge, the lamp cannot be smoothly shifted to its stationary lit state, with a bad startability.

A control circuit, which is proposed as one of measures of improving the aforementioned known device and which includes, in addition to the aforementioned arrangement, a third flip-flop and elements connected thereto, is arranged so that, in a no-load mode wherein the discharge lamp is not started yet, the output of the first comparator is set always at a low level to avoid accumulation of electric charges in its ambient capacitors, and when the transistor is turned OFF and the output of the third flip-flop is changed to its low level, a third resistance is inserted to cause the A.C. voltage to have a sufficiently long polarity inversion period (of, e.g., 10 Hz or less). Therefore, in the case of this discharge lamp lighting device, when the high pulse voltage is applied to almost start the discharge, an identical polarity of voltage is applied for a sufficient long time, whereby the discharge lamp can be easily shifted to its stable discharge state and its startability can be improved. However, the discharge lamp lighting device having the control circuit as such an improving means has still had a problem that the polarity inversion period of the A.C. voltage is long with respect to the entire lamp start time, with the result that an interval between pulses in the high pulse voltage applied to the discharge lamp becomes long and thus its starting time becomes long.

According to another solving means, an LC resonance voltage is used to generate the high pulse voltage. For example, when a set of the first and fourth transistors and a set of the second and third transistors are alternately turned ON and OFF with an On duty of 50%, a high pulse voltage having an equal and continuous level by LC resonance can be applied to the discharge lamp. However, this system has a problem that the voltage applied to the discharge lamp contains no D.C. component, which results in that there cannot be obtained an energy necessary for smoothly shifting the lamp to its arc discharge state after dielectric breakdown.

Further, in order to obtain a high pulse voltage, it is required to set the switching frequency at a value close to the LC resonance frequency. In this case, however, it is necessary to feed a large resonance current, which involves a problem that coils, capacitors, switching elements, etc. undergo great stress.

SUMMARY OF INVENTION

In view of the above problems in the prior art, the present invention has been proposed. It is a major object of the present invention to provide a discharge lamp lighting device which can suitably start and light a discharge lamp with a high pulse voltage obtained through LC resonance, can supply to the discharge lamp an energy necessary for smoothly shifting the lamp to an arc discharge state to improve its startability, and also can reduce costs of constituent parts such as coils, capacitors and switching elements.

The object of the present invention is attained by providing a discharge lamp lighting device which comprises a D.C. power source circuit having a pair of output terminals for supplying a D.C. power; a polarity inverting circuit including a series circuit of at least first and second switching elements connected in parallel with the output terminals of the D.C. power source circuit for converting a D.C. power received from the D.C. power source circuit into an A.C. power; a load resonance circuit including an inductor, a capacitor and a discharge lamp connected in parallel with the capacitor, and a control circuit for alternately turning ON and OFF the first and second switching elements of the polarity inverting circuit to control a voltage to be applied to the discharge lamp of the load resonance circuit, wherein the control circuit alternately turns ON and OFF the first and second switching elements at a high ON/OFF frequency so as to alternately provide a first period during which an ON duration of the second switching element is longer than that of the first switching element and a second period during which the ON duration of the second switching element is shorter than that of the first switching element, to thereby apply a low frequency voltage of a rectangular waveform to the discharge lamp, superimposes a D.C. component upon resonance pulse signal received from the load resonance circuit in the ignition mode of the discharge lamp, and continuously changes a switching frequency of the switching elements to apply a high voltage to the discharge lamp.

BRIEF DESCRIPTION OF THE DRAWINGS

Other objects and advantages of the present invention shall become clear as the following description of the invention advances as detailed with reference to preferred embodiments of the invention as shown in accompanying drawings, in which.

While the present invention should now be described with reference to the preferred embodiments shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1:
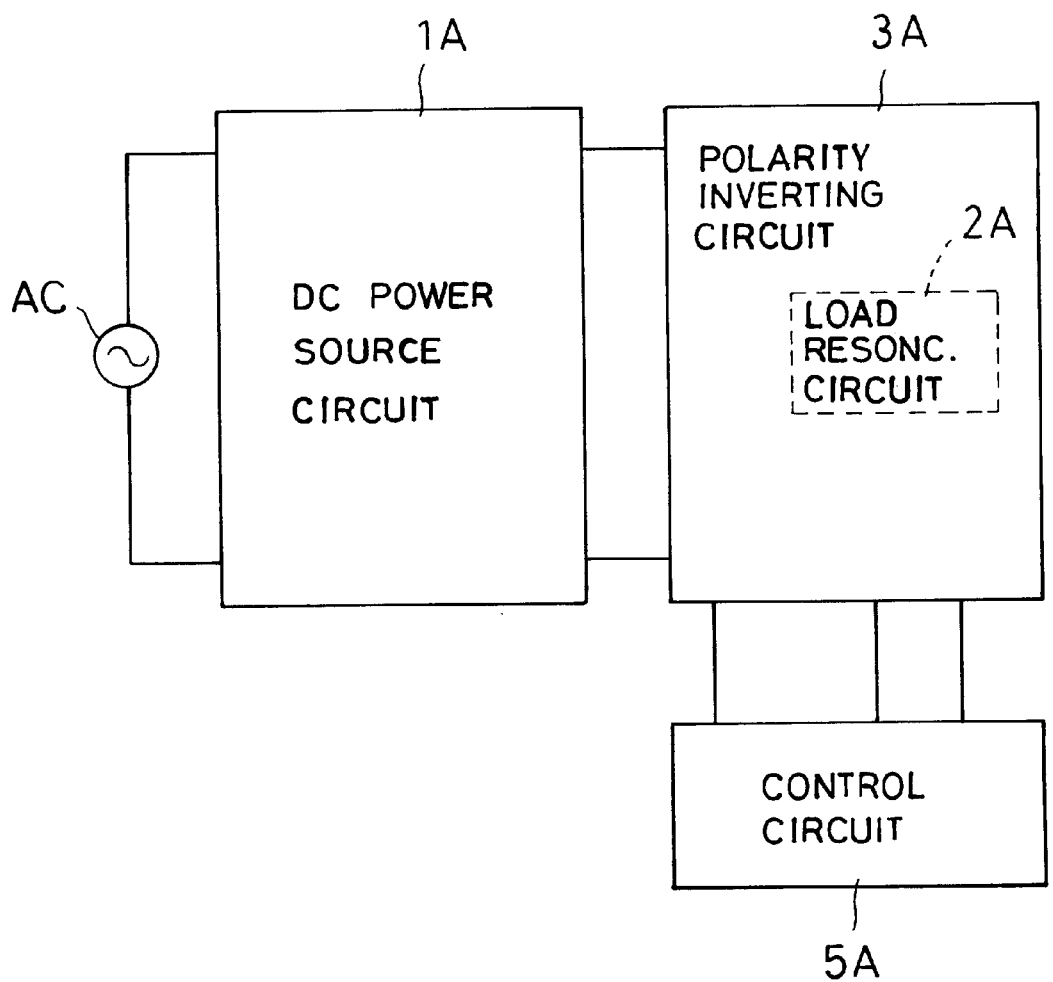
FIG. 1 is a schematic block diagram of a circuit of a discharge lamp lighting device in accordance with a first embodiment of the present invention.

Referring to FIG. 1, there is shown a block diagram of a schematic arrangement of a discharge lamp lighting device in accordance with a first embodiment of the present invention. The illustrated discharge lamp lighting device comprises a D.C. power source circuit 1A for converting an A.C. power received from an A.C. power source AC into a D.C. power and supplying the D.C. power to a pair of output terminals, a polarity inverting circuit 3A including desirably a series circuit of first and second capacitors and a series circuit of second switching elements connected in parallel with the output terminals of the D.C. power source circuit 1A respectively for converting a D.C. power received from the D.C. power source circuit 1A into an A.C. power, a load resonance circuit 2A including desirably a series circuit of an inductor and a capacitor and including a discharge lamp connected in parallel with the capacitor for receiving the A.C. power from the polarity inverting circuit 3h, and a control circuit 5A for alternately turning ON and OFF the switching elements of the polarity inverting circuit to control a voltage supplied to the discharge lamp.

The control circuit 5A alternately turns ON and OFF the first and second switching elements at a high frequency so as to provide a first period during which an ON duration of the second switching element is longer than that of the first switching element and a second period during which the ON duration of the second switching element is shorter than that of the first switching element, to thereby control the duties of the switching elements umbalancingly, change an ON/OFF frequency, and apply a low frequency voltage of a rectangular waveform to the discharge lamp. That is, the control circuit 5A changes the frequency of the switching elements in at least one of the first and second periods to apply a high voltage to the discharge lamp.

With this arrangement, the switching frequency is varied so that, when the LC resonance of the inductor and capacitor becomes its peak, a high pulse voltage as its maximum is applied to the discharge lamp, whereby the discharge lamp can be suitably started and lighted. Further, since the first and second switching elements are alternately turned ON and OFF at a high frequency so as to provide the first period during which the ON duration of the second switching element is longer than that of the first switching element and the second period during which the ON duration of the second switching element is shorter than that of the first switching element, the low frequency voltage of a rectangular waveform can be applied to the discharge lamp and thus an energy capable of smoothly shifting the lamp to an arc discharge mode can be supplied to the discharge lamp. As a result, the discharge lamp can be suitably started and lighted with the high pulse voltage obtained through the LC resonance, and an energy necessary for shifting the lamp to the arc discharge mode can be supplied to the discharge lamp, improving its startability.

Figure 2:
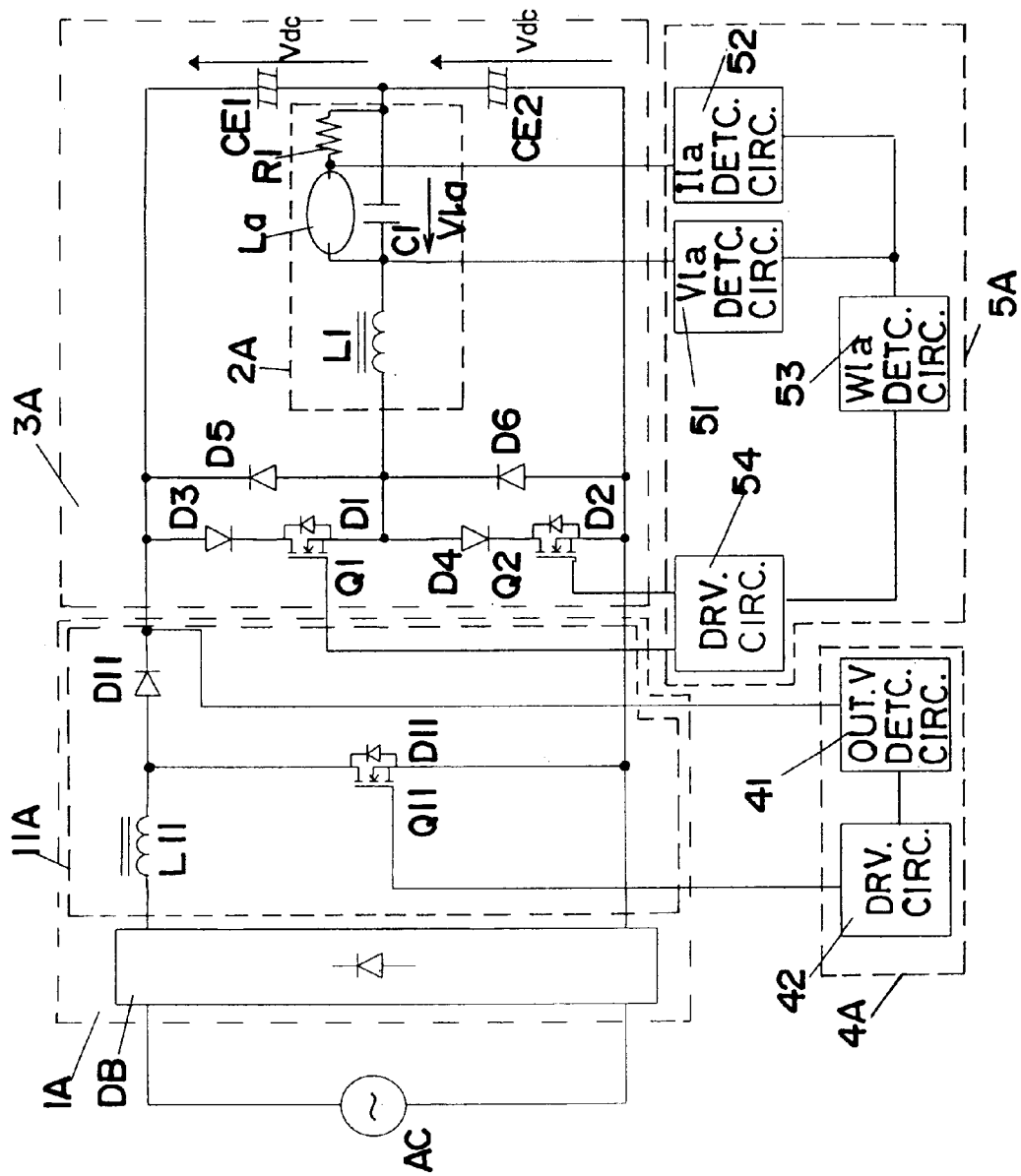
FIG. 2 is a circuit diagram of a detailed arrangement of the embodiment of FIG. 1.

Shown in FIG. 2 is a specific circuit example of the discharge lamp lighting device in accordance with the first embodiment of FIG. 1. The illustrated discharge lamp lighting device comprises a D.C. power source circuit 1A for supply of D.C. power having a boosting chopper circuit 11A; a load resonance circuit 2A having an inductor L1, a capacitor C1 connected in series with the inductor L1, and a series circuit of a discharge lamp (high-intensity discharge lamp) La and a resistance R1 connected in parallel with the capacitor C1; a polarity inverting circuit 3A for converting a D.C. power received from the D.C. power source circuit 1A into an A.C. power and for supplying the A.C. power to the load resonance circuit 2A; a control circuit 4A for the boosting chopper circuit 11A; and a control circuit 5A for the polarity inverting circuit 3A.

The constituent parts of the above device will be explained in more detail. The D.C. power source circuit 1A includes a rectifier DB for receiving the A.C. power from the A.C. power source AC and rectifying the A.C. power and also includes the boosting chopper circuit 11A. The boosting chopper circuit 11A has an inductor L11 connected at its one end to a high-potential output terminal of the rectifier DB, a switching element Switching element Q11 as an FET connected at its drain and source to the other end of the inductor L11 and to a low-potential output terminal of the rectifier DB, and a diode D11 connected at its anode to the other end of the inductor L11. The switching element Q11 is connected at its drain and source to a cathode and anode of the parasitic diode D11 connected to a source substrate.

The polarity inverting circuit 3A has a series circuit of a diode D3, a first switching element Q1 of, e.g., an FET, a diode D4 and a second switching element Q2 of an FET, connected in parallel with the outputs of the D.C. power source circuit 1A; a diode D5 connected in parallel with the diode D3 and first switching element Q1, a diode D6 connected in parallel with the diode D4 and second switching element Q2, and a series circuit of first and second capacitors CE1 and CE2 connected in parallel with the outputs of the D.C. power source circuit 1A. In this connection, like the switching element Q11, the first and second switching elements Q1 and Q2 have parasitic diodes D1 and D2 respectively.

The control circuit 4A for the boosting chopper circuit 11A, which includes an output voltage detection circuit 41 for detecting an output voltage of the boosting chopper circuit 11A and a drive circuit 42 for receiving a detection signal of the output voltage detection circuit 41 to drive the switching element Switching element Q11, functions to generate an ON/OFF control signal and output it to the switching element Q11 for ON/OFF control thereof. Further, for example, as in the prior art, the control circuit monitors the output voltage of the boosting chopper circuit 11A and performs ON/OFF control over the switching element Q11 to controllably boot an output voltage of the rectifier DB to a predetermined level.

The control circuit 5A for the polarity inverting circuit 3A includes a Vla detection circuit 51 for detection of a lamp voltage, an Ila detection circuit 52 for detection of a lamp current, a Wla detection circuit 53 for receiving detection signals of the both detection circuits to calculate a lamp power, and a drive circuit 54 for receiving a calculation signal indicative of the calculated lamp-power to drive the first and second switching elements Q1 and Q2. The control circuit 5A functions to generate an ON/OFF control signal and output it to the first and second switching elements Q1 and Q2 for ON/OFF control thereof.

Figure 3:
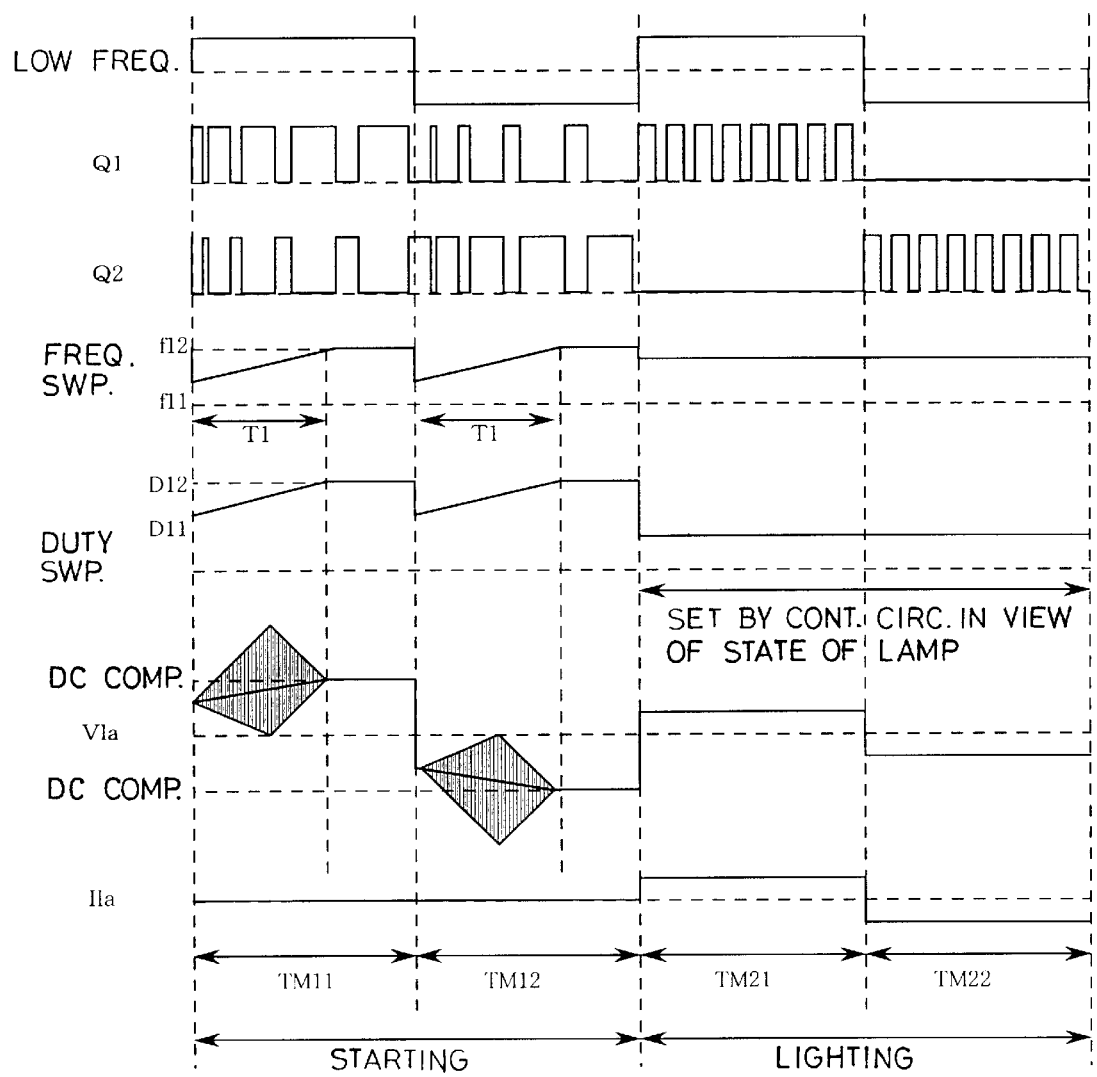
FIG. 3 shows waveforms of signals appearing at various points in the circuit of FIG. 2 in starting and lighting modes.

When the discharge lamp La is in its stationary state, for example, in order to adjust the lamp power obtained from the Wla detection circuit 53 at a predetermined value, control is repetitively carried out with use of ON duty so that, in a duration TM21, the second switching element Q2 is put in its OFF state and the first switching element Q1 is turned ON and OFF at a high frequency; whereas, in a next duration TM22, the first switching element Q1 is put in its OFF state and the second switching element Q2 is turned ON and OFF at a high frequency of several tens of kHz, as shown by TM21 and TM22 in FIG. 3. In this case, a frequency for the durations TM21 and TM22 is set at a low frequency of several tens to several hundreds of Hz. The switching frequency of the first and second switching elements Q1 and Q2 is kept at a constant value.

In contrast to the stationary state control mode, in a starting/lighting control mode wherein the discharge lamp La is started and lighted, the both switching elements Q1 and Q2 are alternately turned ON and OFF at a high frequency so as to provide the a first duration TM12 in which the ON duration of the second switching element Q2 is longer than that of the first switching element Q1 and a second duration TM11 in which the ON duration of the second switching element Q2 is shorter than that of the first switching element Q1, whereby application of a low frequency voltage of a rectangular waveform to the discharge lamp La can be controlled. In this case, the frequency of the durations TM11 and TM12 is set at a low frequency of several tens to several hundreds of Hz.

Further, as shown by "DUTY SWP." in FIG. 3, an ON duty ratio is continuously changed or controllably swept in the durations TM11 and TM12 over a time duration of from their start time points to predetermined time T1. As the ON duration of the element Q1 is gradually increased to the predetermined time T1 in the longer ON duration TM11, and as the ON duration of the element Q2 is gradually increased to the predetermined time T1 in the duration TM12, an D.C. component in the lamp voltage Vla gradually increases. In the example of FIG. 3, an ON duration other than the predetermined time T1 is longer than an ON duration within the predetermined time T1.

Further, in at least one of the first and second durations, the switching frequency of the first and second switching elements Q1 and Q2 are changed to control the application of the high voltage to the discharge lamp La. That is, the control circuit 5A, as shown by "FREQ. SWP." in FIG. 3, changes (sweeps) the switching frequency of the first and second switching elements Q1 and Q2 in the durations TM11 and TM12 over a time duration of from their start time points to the predetermined time T1. In this case, the sweep range is set so as to include an LC resonance peak of the inductor L1 and capacitor C1. In this connection, the sweep gradient of the switching frequency of the first, switching element Q1 may be nearly the same as that of the second switching element Q2.

Schematic explanation will next be made as to the operation of the control circuit 5A which forms a feature of the first embodiment. First the circuit operation in the stationary state control mode will be explained with use of FIG. 3. Control is repetitively carried out so that, in the duration TM21 the second switching element Q2 is put in its OFF state and the first switching element Q1 is turned ON and OFF at a high frequency; whereas, in the duration TM22 the first switching element Q1 is put in its OFF state and the second switching element Q2 is turned ON and OFF at a high frequency. As a result, the lamp voltage Vla of a rectangular waveform is applied to the discharge lamp La, a low frequency current of a rectangular waveform flows through the discharge lamp La, and the discharge lamp La is lit in the stationary state.

Explanation will then be made as to the circuit operation in the starting/lighting control mode. Control is carried out so that the first and second switching elements Q1 and Q2 are alternately turned ON and OFF at a high frequency so as to alternately provide the first duration TM12 in which the ON duration of the second switching element Q2 is longer than that of the first switching element Q1 and the second duration TM11 in which the ON duration of the second switching element Q2 is shorter than that of the first switching element Q1. As a result, a low frequency voltage of a rectangular waveform is applied to the discharge lamp La, so that a D.C. component contained in the lamp voltage Vla causes an energy necessary for shifting the lamp to the arc discharge state to be sufficiently supplied to the discharge lamp La.

At this time, as shown in FIG. 3, such control is carried out as to change the ON duty ratio from D11 to D12 over the predetermined time T1 starting with the start time points of the durations TM11 and TM12. As a result, the D.C. component in the lamp voltage Vla gradually increases. However, at the start time points of the durations TM11 and TM12, the ON duty ratio D12 is returned to the D11.

Further, such control is carried out that, as shown in FIG. 3, the switching frequency of the first and second switching elements Q1 and Q2 is changed from f11 to f12 over the predetermined time T1 starting from the start time points of the durations TM11 and TM12. This results in that at the time point that the LC resonance of the inductor L1 and capacitor C1 becomes a peak, a maximum high pulse voltage is superimposed upon the lamp voltage Vla, whereby the discharge lamp La reaches its dielectric breakdown and thus can be suitably started and lighted. Further, the switching frequency is swept, so that, even when the constituent parts fluctuate in their performance, a maximum high pulse voltage can be applied to the discharge lamp La. However, the switching frequency f12 is returned to f11 at the start time point of the durations T11 and T12.

In the aforementioned first embodiment, the discharge lamp can be suitably started and lighted with the high pulse voltage obtained based on the LC resonance, an energy necessary for smoothly shifting the lamp to the arc discharge state can be supplied to the discharge lamp, thus enabling improvement of a startability thereof.

Figure 4:
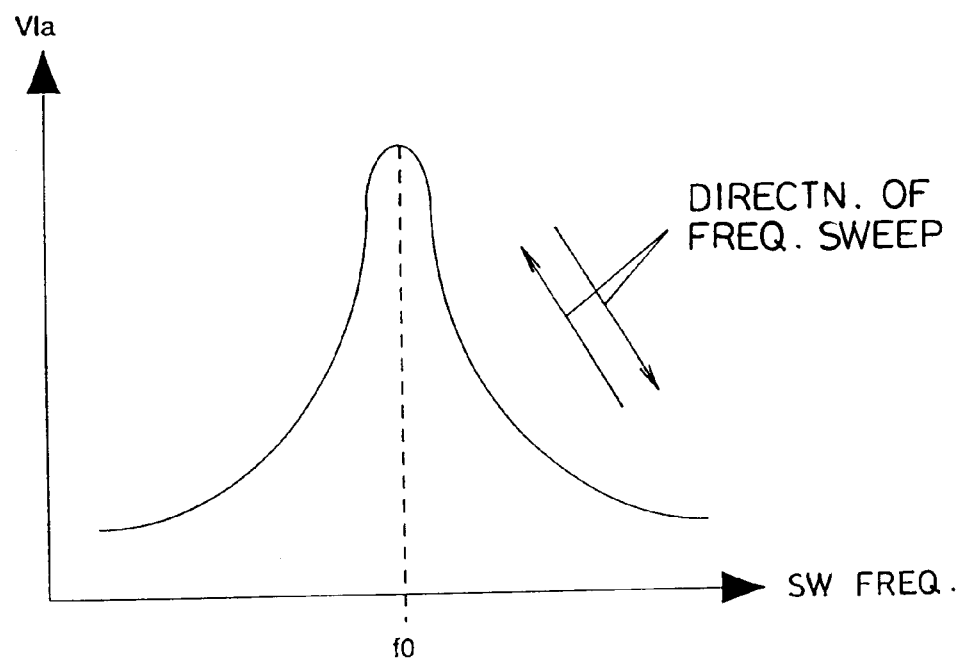
FIG. 4 is a diagram for explaining a switching frequency sweep direction in the operation of the circuit of FIG. 2.

The first embodiment has been arranged so that, in the starting/lighting control mode, the switching frequency of the first and second switching elements Q1 and Q2 is swept from the low value to the high value, as shown in FIG. 3. However, the present invention is not limited to the specific example and such an arrangement may be possible that the switching frequency of both switching elements Q1 and Q2 is swept from the high value to the low value. In short, any arrangement can be employed so long as the control circuit of the both switching elements Q1 and Q2 is arranged so that the switching frequency of the both switching elements Q1 and Q2 is changed to either one of the high and low values in at least one of the first and second durations as shown in FIG. 4, with the result that the peak voltage and voltage growth process of the lamp voltage Vla of the discharge lamp La can be stabilized.

Further, although the FETs, in particular, MOS FETs have been used as the switching elements Q1 and Q2 in the foregoing, any type of transistors may be employed therefor.

Figure 5:
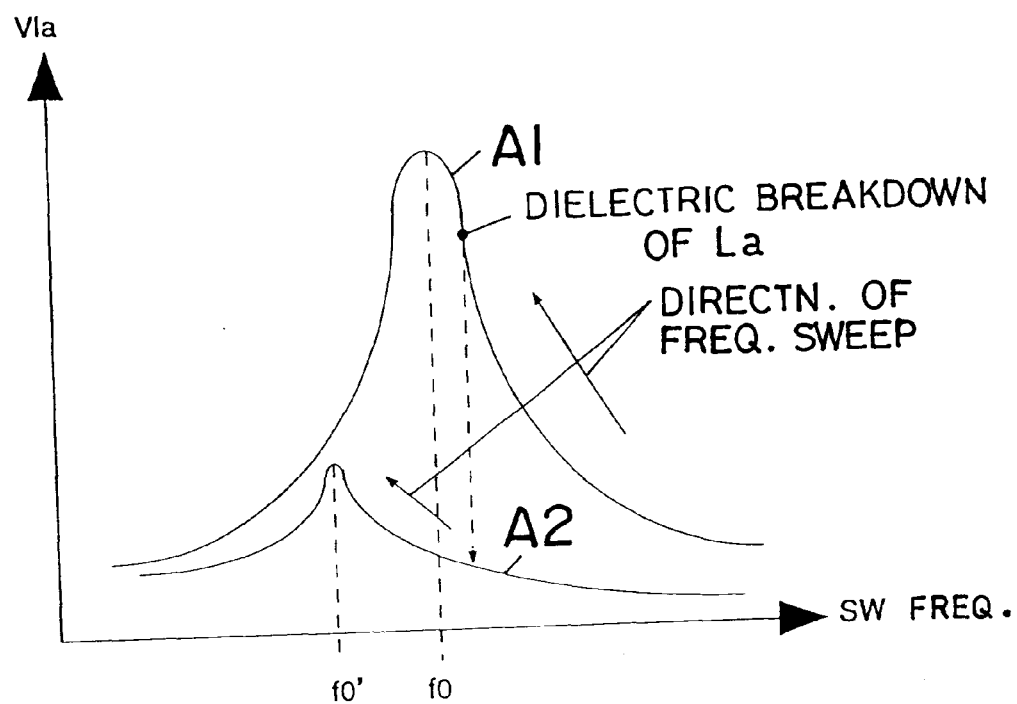
FIG. 5 is a diagram for explaining a frequency sweep direction in the operation of a second embodiment of the present invention.

FIG. 5 is a graph for explaining the frequency sweep in a discharge lamp lighting device in accordance with a second embodiment of the present invention. In this case, the discharge lamp lighting device comprises, as in the first embodiment of FIG. 2, the D.C. power source 1A, load resonance circuit 2A, polarity inverting circuit 3A, and the control circuits 4A and 5A for the circuits 2A and 3A. However, the second embodiment is different from the first embodiment in that a control circuit 5B for the polarity inverting circuit is newly provided in the second embodiment. The control circuit 5B for the polarity inverting circuit in the second embodiment has substantially the same structure as the control circuit 5A in the first embodiment, except that such control is carried out as to change the switching frequency of the first and second switching elements Q1 and Q2 to the low value in at least one of the durations TM11 and TM12 in the starting/lighting control mode. That is, the control circuit 5B functions to change or sweep the switching frequency of the switching elements Q1 and Q2 from the high value f12 to the low value f11 over the predetermined time T1 starting from the start time point of the durations TM11 and TM12.

Explanation will next be made as to the reason why the switching frequency is swept to the low value by the control circuit 5B with reference to FIG. 5. When the discharge lamp La receives dielectric breakdown, the resonance curve in the load resonance circuit 2A is changed from a resonance curve A1 (having a peak fo) in a lamp non-lit mode to a resonance curve A2 after the lamp dielectric breakdown. Under this condition, when the switching frequency of the first and second switching elements Q1 and Q2 is changed to the low value, the switching frequency becomes closer to a peak (fo') of the resonance frequency in the resonance curve A2 after the discharge lamp La underwent the dielectric breakdown. As a result, a large energy suitable for the arc discharge can be obtained and thus the discharge lamp La can be more stably shifted to the arc discharge state.

Figure 6:
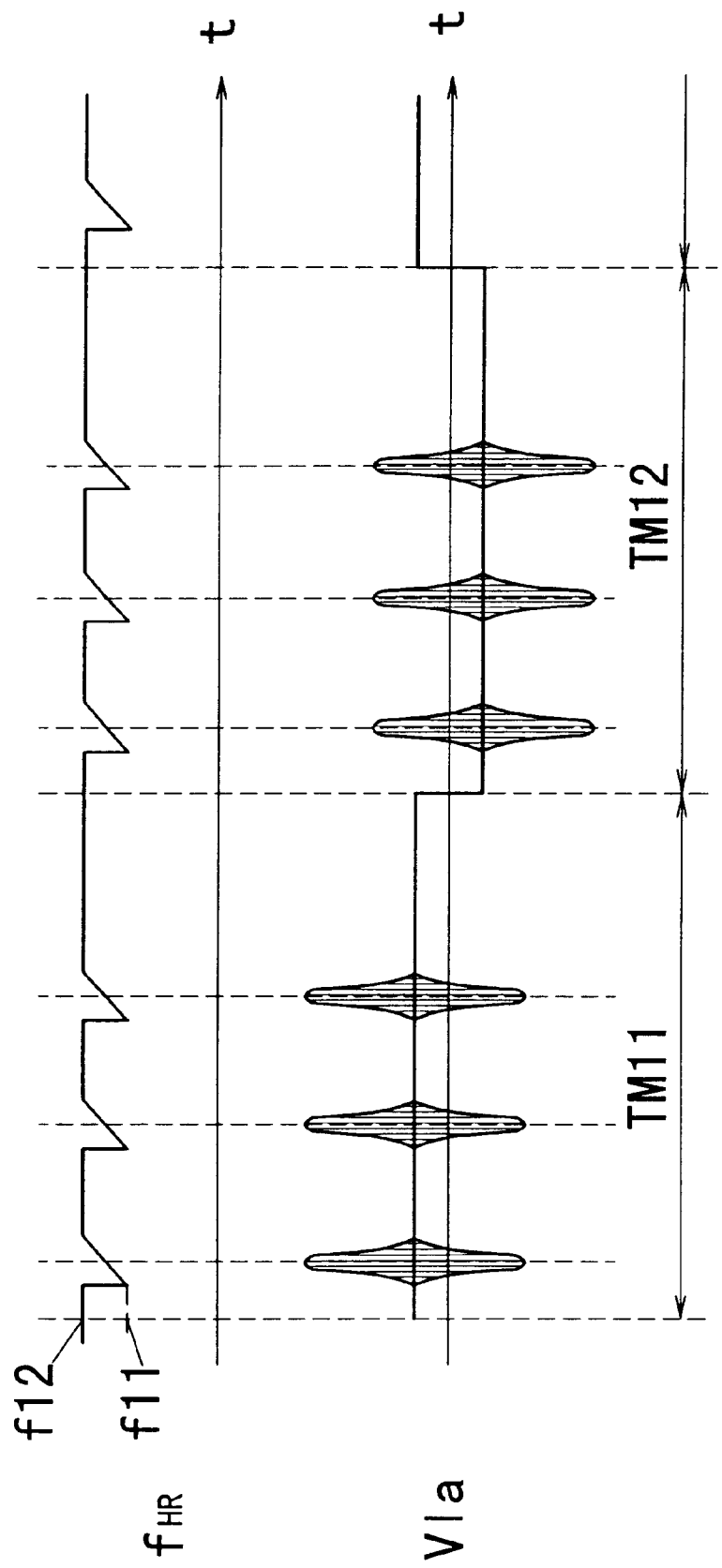
FIG. 6 is a diagram for explaining frequency sweep by a control circuit to a polarity inverting circuit in a third embodiment of the present invention.

FIG. 6 is a diagram for explaining the frequency sweep in a discharge lamp lighting device in accordance with a third embodiment of the present invention, in which the switching frequency of the first and second switching elements Q1 and Q2 is changed by a plurality of times in at least one of the durations TM11 and TM12 in the start mode to apply a high voltage to the discharge lamp La. In this case, a control circuit 5C for the polarity inverting circuit changes (sweeps) the switching frequency $f_{HF}$ of the switching elements Q1 and Q2 in the durations TM11 and TM12 by a plurality of times, for example, 3 times, as shown in FIG. 6. At this time, the sweep range of the switching frequency is set to cover a peak in the LC resonance of the inductor L1 and capacitor C1 of the load resonance circuit 2A.

In this connection, the ON duties of the first and second switching elements Q1 and Q2 may be arranged to be swept with the sweep of the switching frequency as in the first embodiment or to be changed to another constant value only when the switching frequency is swept.

Next the operation of the control circuit 5C forming a feature of the present third embodiment will be schematically explained. First explanation will be directed to the circuit operation in the stationary state control mode. Such control is repeated that the second switching element Q2 is put in its OFF state and the first switching element Q1 is turned ON and OFF at a high frequency in the duration TM21 at the time of lighting the discharge lamp; whereas, the first switching element Q1 is put in its OFF state and the second switching element Q2 is turned ON and OFF at a high frequency in the duration TM22. As result, the lamp voltage Vla of a rectangular waveform is applied to the discharge lamp La, a low frequency current Ila of a rectangular waveform flows through the discharge lamp, and the discharge lamp La is lit in the stationary state.

Explanation will then be made as to the circuit operation in the starting/lighting control mode. Such control is carried out that the both switching elements Q1 and Q2 are alternately turned ON and OFF at a high frequency so as to provide the first duration TM12 in which the ON duration of the second switching element Q2 is longer than that of the first switching element Q1 and the second duration TM11 in which the ON duration of the second switching element Q2 is shorter than that of the first switching element Q1. This results in that a low frequency voltage of a rectangular waveform is applied to the discharge lamp La so that the D.C. component contained in the lamp voltage Vla causes an energy necessary for shifting the discharge lamp to its arc discharge state to be sufficiently supplied to the discharge lamp La.

At this time, as shown in FIG. 6, the switching frequency of the first and second switching elements Q1 and Q2 is changed from f11 to f12 by a plurality of times in the durations TM11 and TM12. Thus for every sweep of the switching frequency, a high pulse voltage changed to its maximum level when the LC resonance of the inductor L1 and capacitor C1 of the load resonance circuit 2A becomes a peak, is superimposed upon the lamp voltage Vla, resulting in that the discharge lamp La reaches its dielectric breakdown and therefore the lamp can be suitably started and lighted. Further, the sweeping of the switching frequency enables a maximum high pulse voltage to be applied to the discharge lamp La even when the constituent parts fluctuate in their manufacturing constants.

As mentioned above, not only the third embodiment can exhibit substantially the same effects as the first embodiment but also the discharge lamp La can be started and lighted more suitably than in the first embodiment. Further, when the output of an oscillator for generation of a rectangular waveform voltage is used as a signal for timing of generation of the frequency sweeping operation, the circuit can be simplified.

Figure 7:
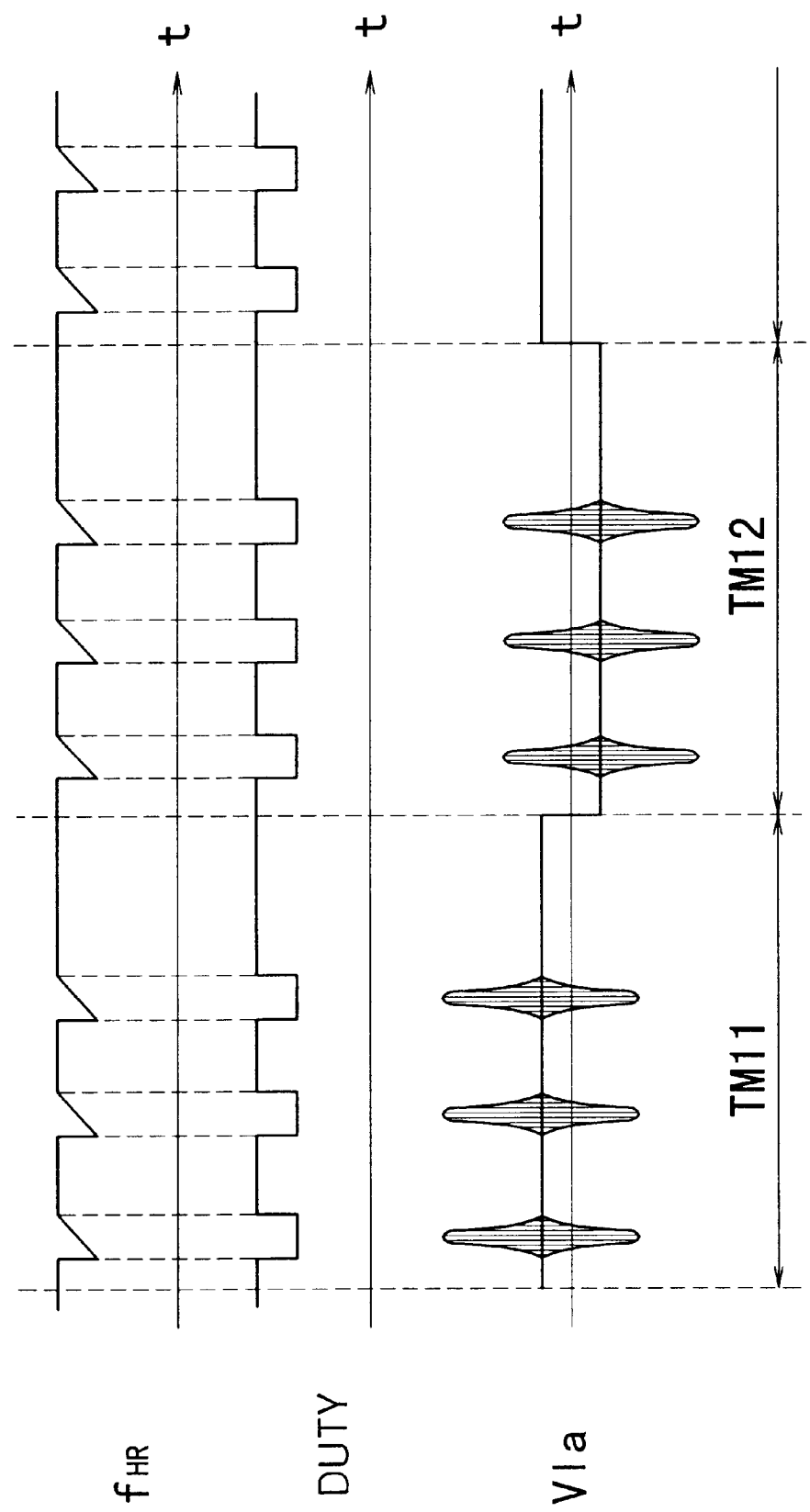
FIG. 7 is a diagram for explaining frequency sweep by a control circuit to a polarity inverting circuit in a fourth embodiment of the present invention.

FIG. 7 is a diagram for explaining the frequency sweep of a control circuit for a polarity inverting circuit in a discharge lamp lighting device in accordance with a fourth embodiment of the present invention. In this case, the discharge lamp lighting device, as in the third embodiment, comprises a D.C. power source circuit, a load resonance circuit, a polarity inverting circuit, a control circuit for the D.C. power source circuit, and a control circuit for the polarity inverting circuit. However, the fourth embodiment is different from the third embodiment in that a control circuit 5D for the polarity inverting circuit is newly provided which includes a Vla detection circuit, an Ila detection circuit and a drive circuit, and in that the control circuit 5D change the duty to a smaller constant value for each sweep of the switching frequency of the first and second switching elements Q1 and Q2 in the durations TM11 and TM12 at the time of starting the lamp in the starting/lighting control mode as shown in FIG. 7. And the other operation of the control circuit 5D is substantially the same as the control circuit 5C of the third embodiment.

Explanation will now be made as to the reason why the duty is changed as in the above. Since the discharge lamp La is of a high-intensity type, it is desirable first to apply a high voltage to the discharge lamp La to start discharge and then to supply a sufficient amount of power at the time of occurrence of arc discharge to shift the discharge to its stable state.

In the sweep duration of the switching frequency, in order to further increase the high voltage, it is necessary to approach the duty to 0.5. However, the closer the duty comes to 0.5, the more the D.C. component contained in the voltage applied to the discharge lamp La is inversely decreased. When arc discharge takes place under a condition that the D.C. component was decreased in this way, a power sufficient to shift the discharge to its stable state cannot be supplied to the discharge lamp La so that the discharge lamp La may flicker out in some cases.

To avoid this, in the sweeping operation of the switching frequency, the duty is made smaller so that the duty comes closer to 0.5, whereby a higher pulse voltage can be applied to the discharge lamp La; whereas, in the operation other than the switching frequency sweep operation, the duty is made larger than 0.5 so that a power sufficient to shift the discharge state of the discharge lamp La to its stable state can be supplied to the discharge lamp La.

As has been explained above, the fourth embodiment can exhibit substantially the same effects as the first embodiment.

Figure 8:
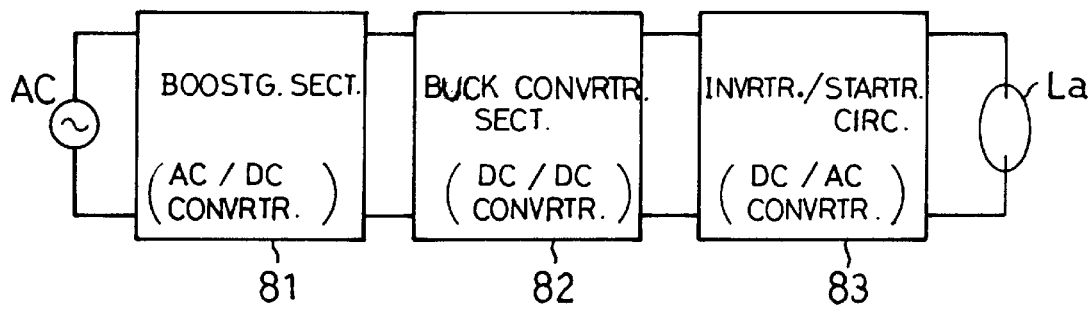
FIG. 8 is a block diagram of a circuit of a fifth embodiment of the present invention.
Figure 9:
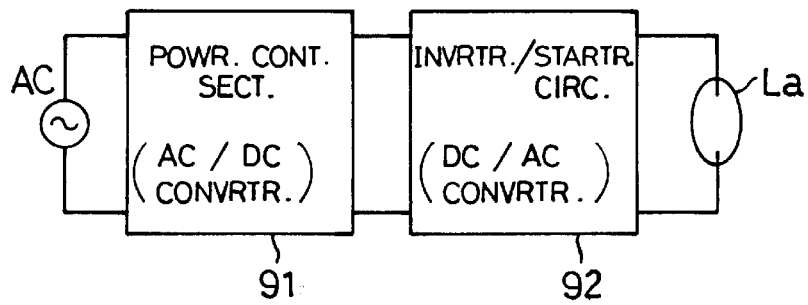
FIG. 9 is a block diagram of a circuit of a sixth embodiment of the present invention.
Figure 10:
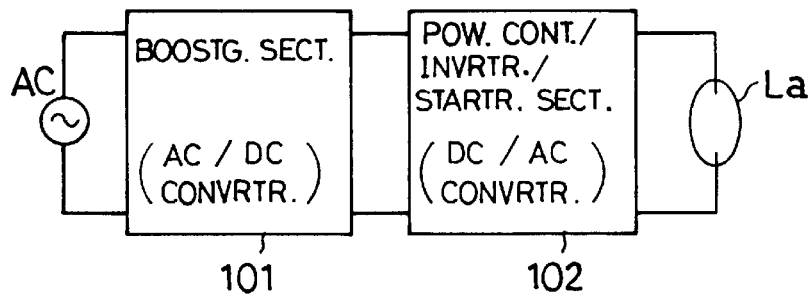
FIG. 10 is a block diagram of a circuit of a seventh embodiment of the present invention.

FIGS. 8, 9 and 10 show fifth, sixth and seventh embodiments of the present invention. A discharge lamp lighting device in accordance with the fifth embodiment of FIG. 8 comprises a boosting section 81 (AC/DC converter) for converting an A.C. power of an A.C. power source AC to a predetermined D.C. voltage; a buck converter section 82 (DC/DC converter) for stabilizing an output of the boosting section as a power to be supplied to the discharge lamp and for controlling a lighting voltage and current of the discharge lamp at their suitable levels; and an inverter/starter circuit 83 (DC/AC converter) for converting an D.C. output of the buck converter section 82 to a low frequency signal of a rectangular waveform, supplying the rectangular waveform signal to the discharge lamp, and generating a high frequency/high voltage signal containing the D.C. component at the time of starting the discharge lamp.

The device of the sixth embodiment of FIG. 9 comprises a power controller 91 (AC/DC converter) for converting an A.C. power of an A.C. power source AC to a D.C. power, stabilizing the D.C. power as a power to be supplied to the discharge lamp, and suitably controlling a lighting voltage and current of the discharge lamp; and an inverter/starter circuit 92 (DC/AC converter) for converting an D.C. output of the power controller 91 to a low frequency power of a rectangular waveform and a high frequency, high voltage containing the D.C. component at the time of starting the discharge lamp.

The device of the seventh embodiment of FIG. 10 comprises a booting section 101 (AC/DC converter) for converting an A.C. power of an A.C. power source AC to a predetermined D.C. voltage; and a power controller/ inverter/starter circuit 102 (DC/AC converter) for stabilizing an output voltage of the boosting section as a power to be supplied to the discharge lamp, suitably controlling a lighting voltage and current of the discharge lamp, converting the output of the boosting section to a low frequency power of a rectangular waveform to be supplied to the discharge lamp, and generating a high frequency, high voltage containing a D.C. component at the time of starting the discharge lamp.

The A.C. power source AC and boosting sections 81 and 101 in the fifth to seventh embodiments may be replaced by a D.C. power source, and the boosting section and power controller 91 may have a function of suppressing an increase in distortion in the input current from the A.C. power source AC to keep a power factor high. Further, the inverter/starter circuits 83 and 92 and power controller/inverter/starter circuit 102 include each a resonance circuit as a series circuit of at least one pair of an inductor and a capacitor, the discharge lamp La being connected between both ends of the capacitor.

In the operation of the devices of the fifth to seventh embodiments, at the time of starting the discharge lamp, the lighting operation is carried out while changing the frequency to a high frequency close to the resonance frequency of the resonance circuit. As a result, even when the resonance frequency is changed with fluctuations of the inductor and capacitor of the resonance circuit in their manufacturing preset constants at the time of manufacturing these elements, the lighting operation is carried out while changing the frequency, so that the resonance voltage for starting the lamp can be reliably generated. Further, since the circuit operation is not fixed to the resonance frequency, a time period during, which generation of the resonance voltage causes generation of a large resonance current, can be shortened and thus stresses imposed on the respective constituent elements can be reduced.

The inverter/starter circuit 83 and power controller/ inverter/starter circuit 102 operate to superimpose the D.C. component upon the above high voltage based on the resonance at the time of starting the lamp. For example, when the duties of switching elements operating at a high frequency are made unbalanced in a bridge type inverter, a D.C. component corresponding to the duty ratio appears between both ends of the capacitor, and a resonance voltage having the superimposed D.C. component appears across the discharge lamp. Therefore, the resonance voltage causes the discharge lamp to undergo dielectric breakdown and start, after which the D.C. component causes the lamp to be easily shifted from the glow discharge to the arc discharge, thus improving the startability of the lamp.

Although the switching elements in the polarity inverting circuit and inverter circuit have been illustrated as arranged in the form of a half bridge in the foregoing embodiments, the inverter may be arranged in the form of a full bridge in the present invention.

Figure 11:
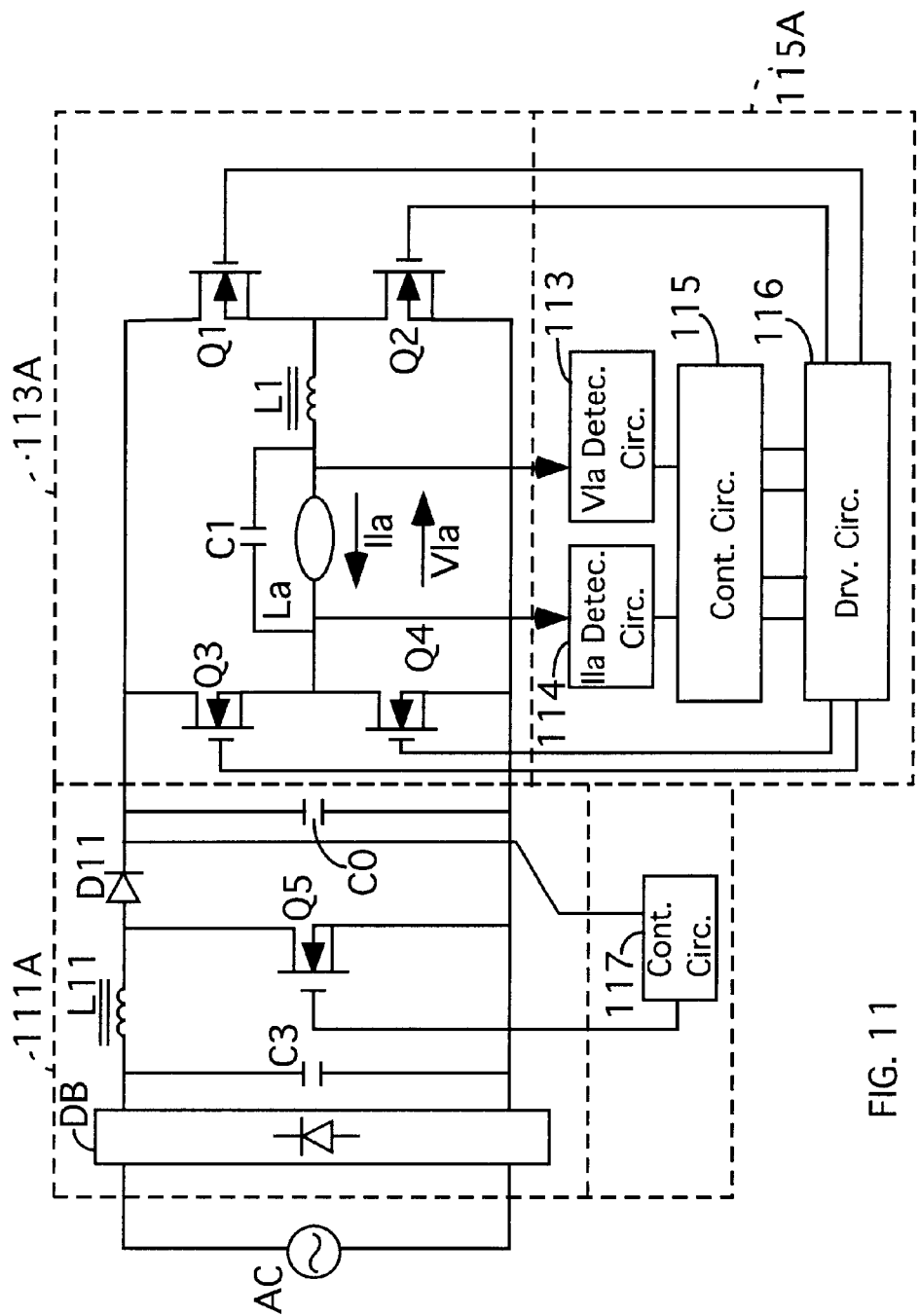
FIG. 11 is a circuit diagram of an eighth embodiment of the present invention.

An eighth embodiment shown in FIG. 11 comprises a polarity inverting circuit 113A which includes an inverter circuit having switching elements arranged in the form of a full bridge. The circuit 113A includes a series circuit of first and second switching elements Q1 and Q2, e.g., as MOS FETs and a series circuit of third and fourth switching elements Q3 and Q4, both connected to output terminals of a D.C. power source circuit 111A respectively; a series circuit of a capacitor C1 and an inductor L1 wired between a node of first and second switching elements Q1 and Q2 and a node of the third and fourth switching elements Q3 and Q4; and a high-intensity discharge lamp La connected in parallel with the capacitor C1. Also included in the discharge lamp lighting device is a control circuit 115A for the polarity inverting circuit, which includes a lamp current detection circuit 114, a lamp voltage detection circuit 113, a control circuit 115 and a drive circuit 116.

Figure 12:
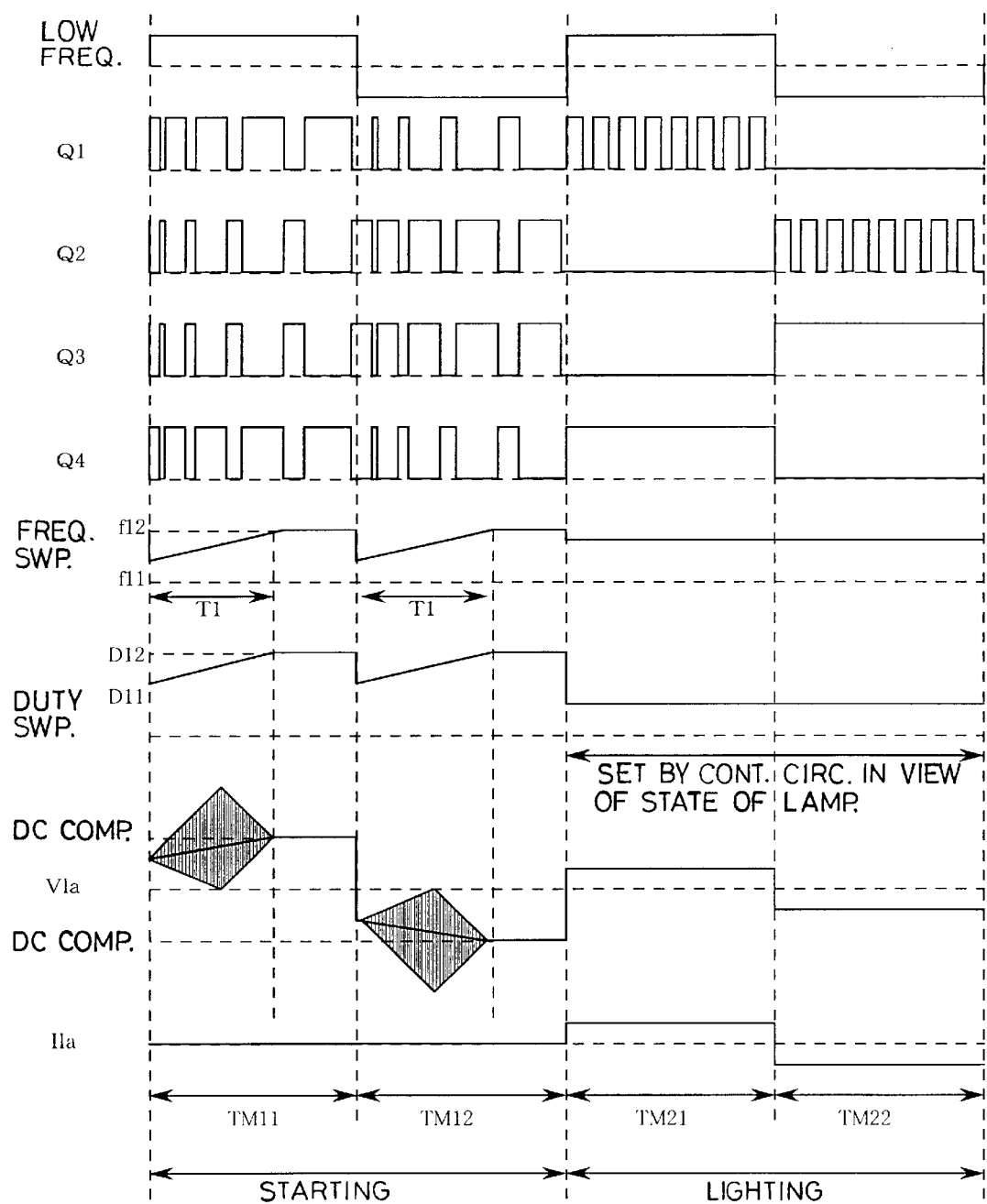
FIG. 12 shows waveforms of signals appearing at various points in the circuit of FIG. 11.

In the no-load mode of the discharge lamp La, the switching elements Q1 to Q4 are alternately turned ON and OFF at a relatively high frequency by drive signals received from the drive circuit 116 under control of signals from the control circuit 115, as shown by waveforms of the signals of the elements Q1 to Q4 in FIG. 12. At this time, when the ON/OFF frequency is set at a value close to the resonance frequency of the series circuit of the inductor L1 and capacitor C0, such a high voltage Vla as shown in FIG. 12 appears across the capacitor C1 and causes the discharge lamp La to undergo dielectric breakdown and start. When the no load state is continued, the aforementioned no-load state operation is intermittently carried out.

When the discharge lamp La is next started and put in its stationary state, a time period, during which the first and third switching elements Q1 and Q3 are switched at a high frequency, is alternately repeated at a relatively low frequency. The fourth switching element Q4 is put in its ON state during high-frequency switching of the first switching element Q1, and the second switching element Q2 is put in its ON state during high-frequency switching of the third switching element Q3. As a result, a lamp current Ila containing high frequency ripple components superimposed upon a D.C. component flows through the discharge lamp La and is alternated at a low frequency, whereby the discharge lamp is lighted with a voltage of a nearly rectangular waveform.

A suitable output can be supplied to the discharge lamp La, since the switching of the switching elements Q1 to Q4 is controlled by the control circuit 115 receiving signals from the lamp voltage detection circuit 113 and lamp current detection circuit 114.

Even in the present eighth embodiment, as in the aforementioned embodiments, in a unstable discharge state shifting to the stationary state after the discharge lamp La underwent dielectric breakdown and started, the lamp current Ila is made to more flow to facilitate shift of the lamp to the arc discharge state and to improve its startability. Operation after the lamp started is substantially the same as in the respective embodiments and thus explanation thereof is omitted.

Figure 13:
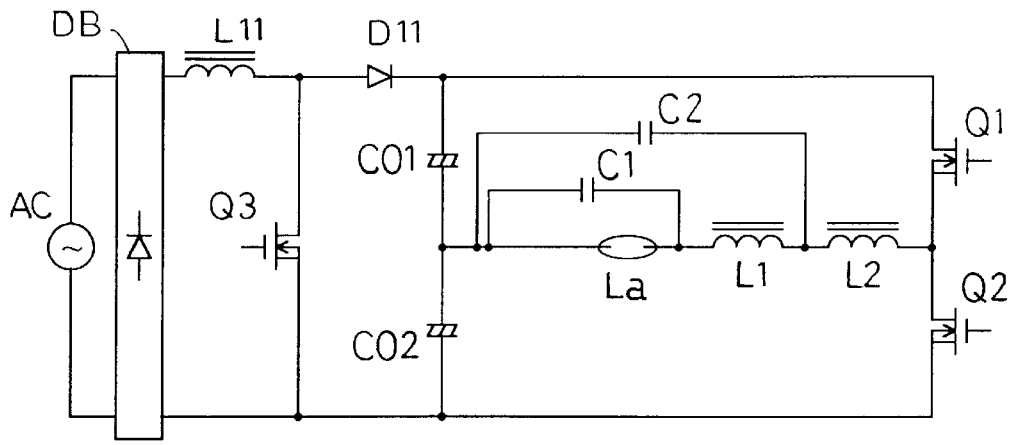
FIG. 13 is a circuit diagram of a ninth embodiment of the present invention.

A ninth embodiment of FIG. 13 is substantially the same as the eighth embodiment, except that the third and fourth switching elements Q3 and Q4 in the full bridge of the switching elements of the inverter circuit in FIG. 11 are replaced by a series circuit of capacitors C01 and C02, a capacitor C2 is connected across a series circuit of the inductor L1 and capacitor C1, and an inductor L2 is inserted between a node of the inductor L1 and capacitor C2 and a node of the first and second switching elements Q1 and Q2, thus forming a double LC resonance circuit.

When a high-intensity discharge lamp is used as the discharge lamp La, the lamp is usually not lighted at a high frequency of several tens of kHz as in a fluorescent lamp. This is because an acoustic resonance phenomenon may take place in such a high frequency region of the lamp, causing unstable discharge. Thus, in the case of the high-intensity discharge lamp, in order to avoid this, the lamp is lighted with a low frequency voltage or current of a rectangular waveform. Even in this case, however, high frequency components are superimposed upon the lamp current by high frequency switching of the first and second switching elements in the stationary lit mode, as in the foregoing embodiments. In particular, when the high frequency components become large, such an acoustic resonance phenomenon as mentioned above tends to undesirably take place. To avoid this, in the present ninth embodiment, the inductor L2 and capacitor C2 forming the double resonance circuit also form a low pass filter for eliminating such high frequency components. Since the filter can eliminate high frequency components, the acoustic resonance phenomenon can be prevented from taking place.

Figure 14:
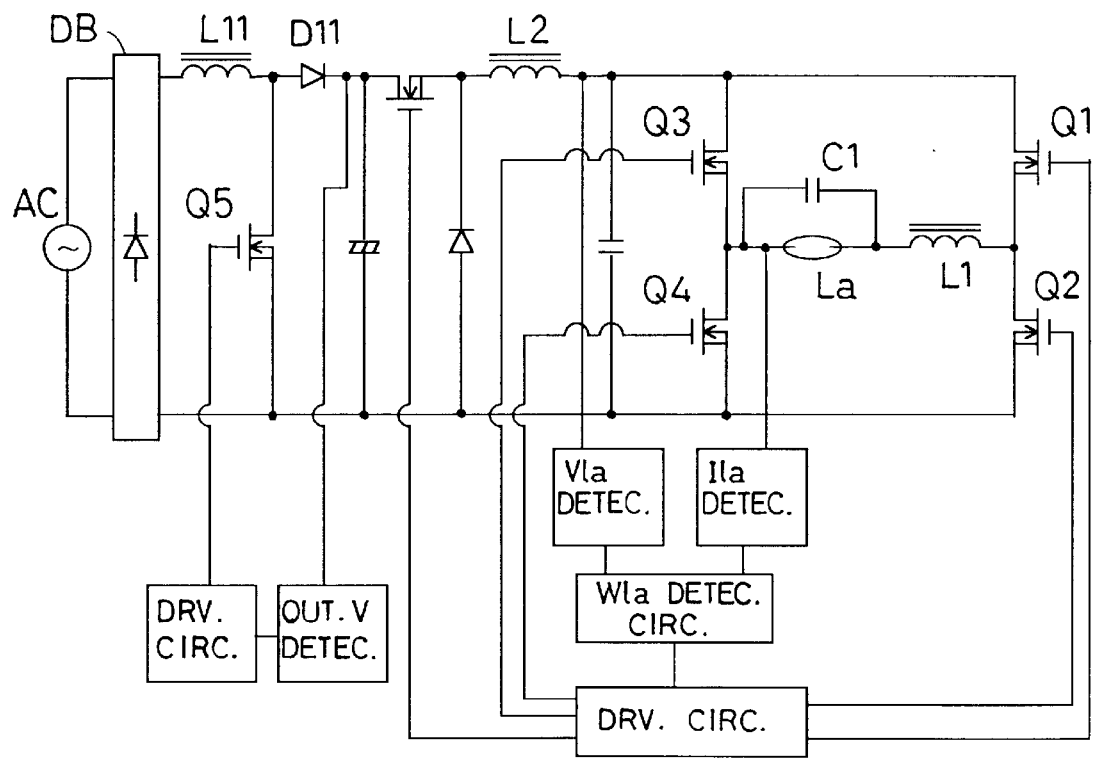
FIG. 14 is a circuit diagram of a tenth embodiment of the present invention.
Figure 15:
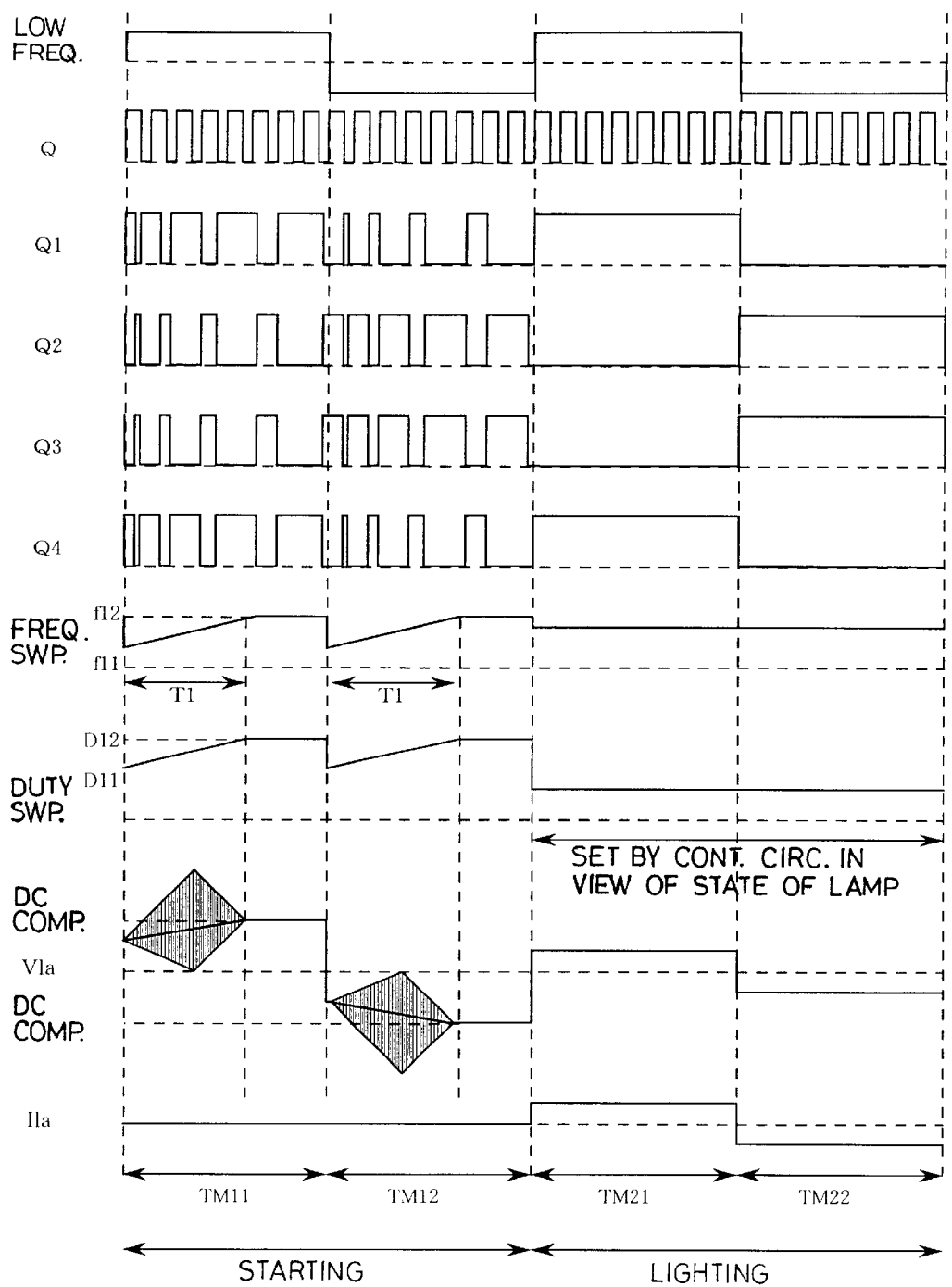
FIG. 15 shows waveforms of signal appearing at various points in the circuit of FIG. 14.

In the foregoing embodiments, control of the power to be supplied to the discharge lamp has been carried out by the inverter circuit portion of the polarity inverting circuit. However, the power control portion can be provided as separated from the inverter circuit portion, as in a tenth embodiment shown in FIG. 14. In this case, the power control portion is provided in the form of a back converter circuit, in which the lamp power detecting means 53 is set at a suitable lamp power value on the basis of detection values of the lamp voltage detecting means 51 and lamp current detecting means 52, and the drive circuit 54 correspondingly controls the operation of the switching elements Q1 to Q4 in the inverter portion. An output thus obtained is converted by the inverter circuit portion to a low frequency power of a rectangular waveform and then supplied to the discharge lamp La. The switching elements Q1 to Q4 in the inverter circuit portion operate as shown by waveforms thereof in FIG. 15, which results in that, as in the foregoing embodiments, a resonance voltage having a superimposed D.C. component is generated and used to start the discharge lamp La.

In the foregoing embodiments, switching between the starting and lighting modes is not particularly specified, but the lit state of the discharge lamp can be detected by the lamp current or voltage detecting means to perform the mode switching, or the starting operation can be continued for a predetermined time interval after turning ON the power and then be switched to perform the lighting operation.

Figure 16:
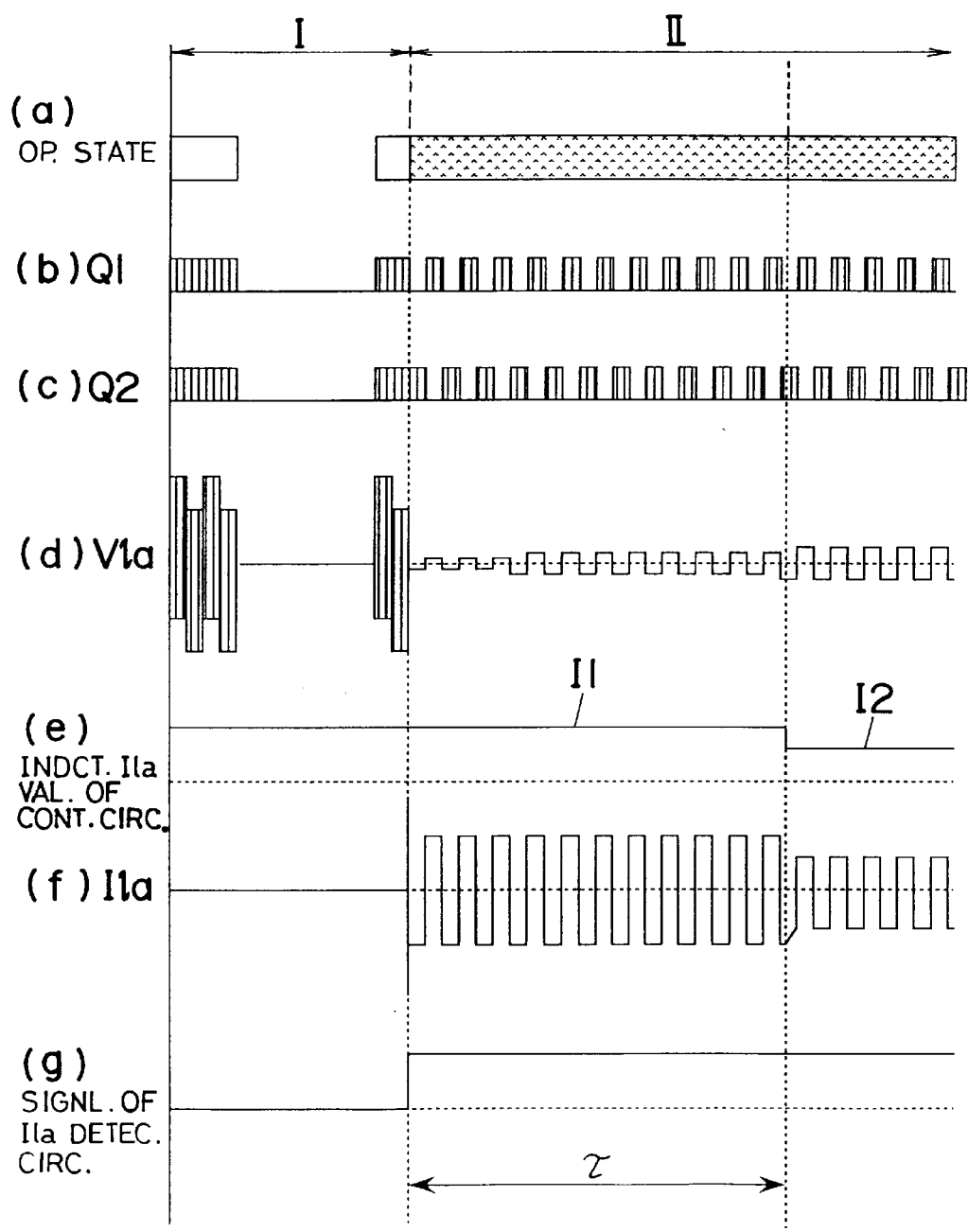
FIG. 16 shows waveforms of signal appearing at various points in the circuit of an eleventh embodiment of the present invention.

Shown in FIG. 16 is a waveform diagram for explaining the operation of an eleventh embodiment including a control circuit which is arranged to increase the lamp current immediately after starting the discharge lamp to improve its startability in the arrangement of the first embodiment. More in detail, FIG. 16(a) shows a no-load intermittent operation state (I) in which a resonance voltage in the no-load mode is intermittently applied to the discharge lamp La, and a no-load stationary operation state (II). In the no-load intermittent operation state (I), as shown in FIGS. 16(b) and 16(c), control is carried out so that the high-frequency switching operation of the switching elements Q1 and Q2 is intermittently carried out, the then voltage applied across the discharge lamp La is high as shown in FIG. 16(d).

At this time, under control of the control circuit 5A, the lamp current Ila to be passed through the discharge lamp La has a current value I1 larger than a current value I2 of the usual lit mode as shown in FIG. 16(e). When the resonance voltage in the no-load mode causes the discharge lamp La to undergo dielectric breakdown and start, energy is supplied to the discharge lamp La from the D.C. power source circuit 1A via the inverter circuit portion of the polarity inverting circuit 3A so that the lamp current Ila starts to flow through the lamp as shown in FIG. 16(f). The lamp current detection circuit 52 detects a flow start point of the lamp current Ila to detect a start of the discharge lamp La. That is, the lamp current detection circuit 52 is used also as a lit-state discriminating means.

When detecting the lamp start, the lamp current detection circuit 52 outputs such a detection signal as shown in FIG. 16(g). When receiving the detection signal from the circuit 52, the control circuit 5A controls the switching operation of the switching elements Q1 and Q2 in such a manner that a current flows having the current value I2 larger than the usual current value I1 determined by detection signals of the lamp current and voltage detection circuits 52 and 51. As a result, when the discharge lamp La after undergoing dielectric breakdown is started and lighted, more lamp current Ila can be passed through the lamp in the unstable discharge state before shifting to the stationary state, the shift to the arc discharge state can be facilitated and thus its startability can be improved.

After passage of the above constant duration τ, the control circuit 5A controls the switching operation of the switching elements Q1 and Q2 so as to supply the current value I1 determined by the detection signals of the lamp current and voltage detection circuits 52 and 51.

Figure 17:
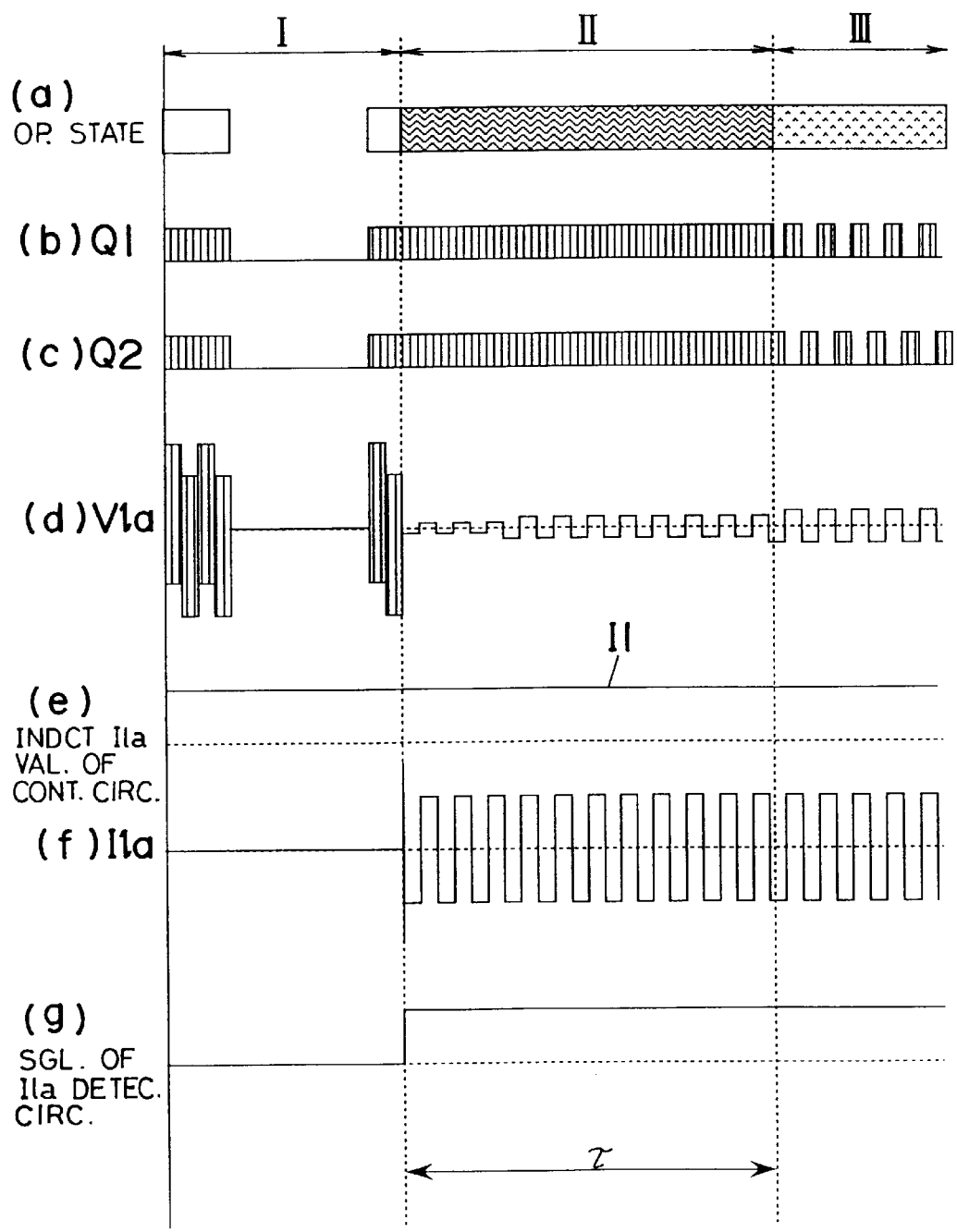
FIG. 17 is a timing chart for explaining the operation of a circuit of a twelfth embodiment of the present invention.

FIG. 17 is a waveform diagram for explaining the operation of a twelfth embodiment. A device according to the present embodiment, in addition to the circuit configuration of the first embodiment, includes a means for intermittently applying a start voltage. The control circuit 5A stops the intermittent start-voltage applying means immediately after starting the discharge lamp and continues the starting operation of the discharge lamp.

In a no-load operation duration (I) shown by FIG. 17(a), assuming now that a high resonance voltage in the no-load state shown by FIG. 17(d) causes the discharge lamp La to undergo dielectric breakdown and start, then an energy is supplied to the discharge lamp La from the D.C. power source circuit 1A, so that the lamp current Ila starts to flow as shown by FIG. 17(f). When the lamp current detection circuit 51 detects a start of flowing of the lamp current Ila to detect a start of the discharge lamp La, the circuit 51 outputs such a detection signal as shown by FIG. 17(g) to the control circuit 5A. The circuit 5A when receiving the detection signal controls the switching elements Q1 and Q2 to perform such switching operation as shown by FIGS. 17(b) and 17(c) for the constant duration τ as in the no-load state, and to stop the intermittent operation in the no-load state for continuous operation. And after passage of the constant duration τ, control is shifted to the stationary operation.

As a result, shift can be facilitated from the unstable state immediately after the start of the discharge lamp La to the stable lit state. Further, after the lamp shifted to a stable lit operation duration (III), the switching is shifted to the stationary state, whereby reliable start can be realized. In addition, after the discharge lamp La underwent the dielectric breakdown, the intermittent operation is stopped for the continuous operation, so that the flickering out of the discharge lamp La caused by the intermittent oscillating operation can be avoided and its startability can be improved. FIG. 17(e) shows the value of the lamp current Ila instructed by the control circuit 5A.

Figure 18:
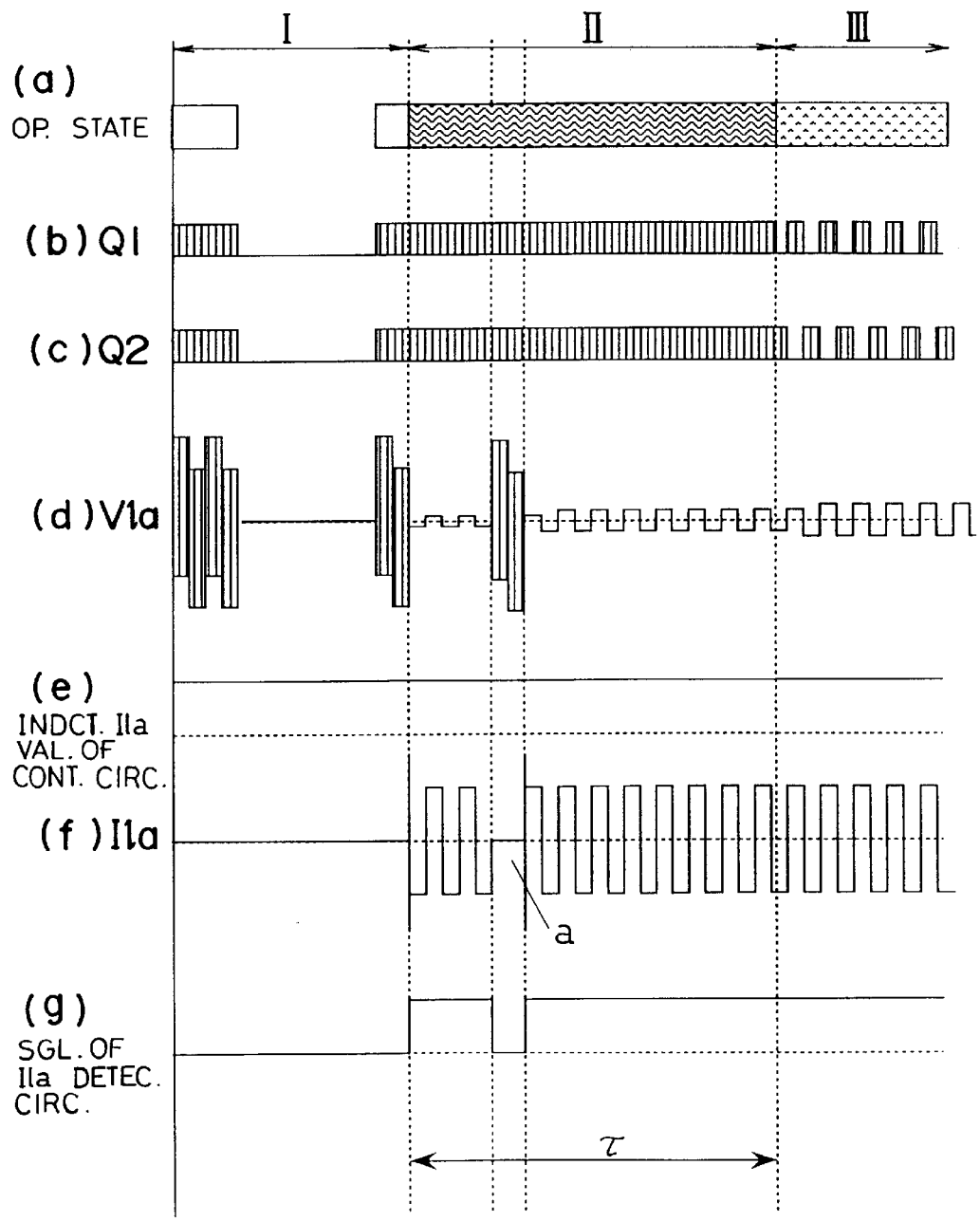
FIG. 18 is a timing chart for explaining the operation of a circuit of a thirteenth embodiment of the present invention.

In the no-load continuous operation duration (II) after the dielectric breakdown, even if the discharge lamp La flickers out, no lamp current Ila flows as shown by "a" in FIG. 18(f) and the detection signal of the lamp current detection circuit 51 is not output as shown in FIG. 18(g); the continuation of the continuous no-load operation causes such a high resonance voltage as shown in FIG. 18(d) to be applied across the discharge lamp La. This results in that dielectric breakdown again can take place to cause the start of the discharge lamp La, thus ensuring the reliable start of the lamp. FIG. 18, (a) to (g) shows a timing chart corresponding to FIG. 17, (a) to (g).

Figure 19:
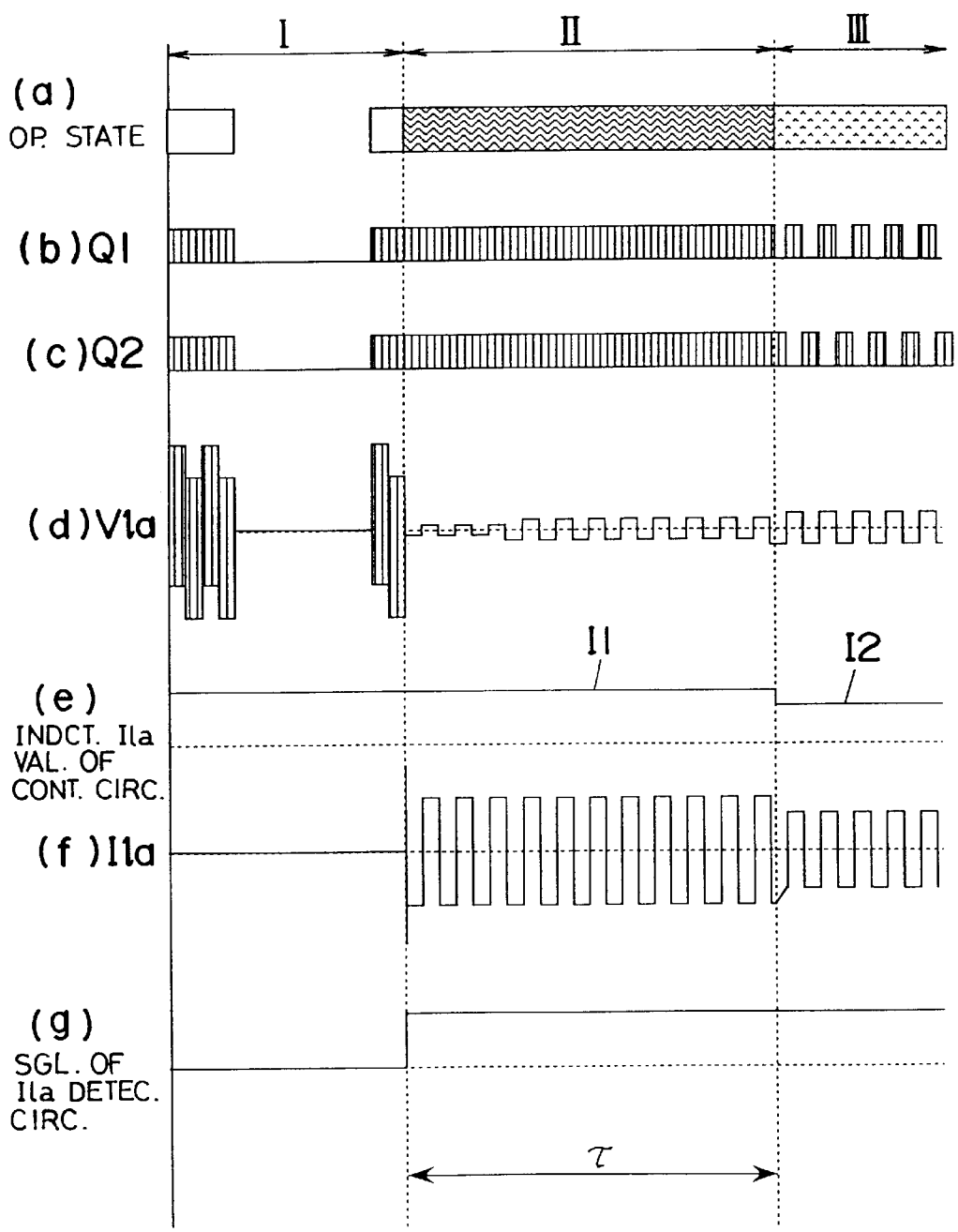
FIG. 19 is a timing chart for explaining the operation of a fourteenth embodiment of the present invention.

FIG. 19 is a waveform diagram for explaining the operation of a thirteenth embodiment. A device of the present embodiment has an intermittent start-voltage applying means as in the twelfth embodiment. The control circuit 5A stops intermittent start-voltage applying means immediately after the lamp starts, continues the start of the discharge lamp, and increases the lamp current.

In a no-load state operation duration (I) shown in FIG. 19(a), if such a high voltage Vla based on the resonance voltage in the no-load state as shown by FIG. 19(d) causes the discharge lamp La to undergo dielectric breakdown and start, then an energy is supplied to the discharge lamp La from the D.C. power source circuit 1A so that such a lamp current Ila as shown by FIG. 19(f) starts to flow. When the lamp current detection circuit 52 detects a start of flowing of the lamp current Ila to detect the start of the discharge lamp La, the circuit 52 outputs such a detection signal as shown by FIG. 19(g) to the control circuit 5A. When receiving the detection signal, the control circuit 5A controls the switching elements Q1 and Q2 to perform switching operation similar to as in the no-load state as shown in FIGS. 19(b) and 19(c), stops the intermittent operation in the no-load state for continuous operation. The control circuit 5A also controls the switching elements Q1 and Q2 in such a manner that the then lamp current Ila flows having a value I1 larger than a value I2 determined by signals of the lamp current and voltage detection circuits 52 and 51 as shown by FIG. 19(e). And after passage of the constant duration τ, control is shifted to the stationary state.

As a result, shift can be facilitated from the unstable state immediately after the start of the discharge lamp La to the stable lit state. Further, after the lamp is shifted to the stable lighting state operation duration (III), the lamp is shifted to the stationary state switching, whereby the lamp can be reliably started. In addition, after the discharge lamp La undergoes dielectric breakdown, the lamp stops the intermittent operation and starts the continuous operations, with the result that the flickering out of the discharge lamp La caused by the intermittent oscillating operation can be avoided and an improvement in the startability can be realized.

Figure 20:
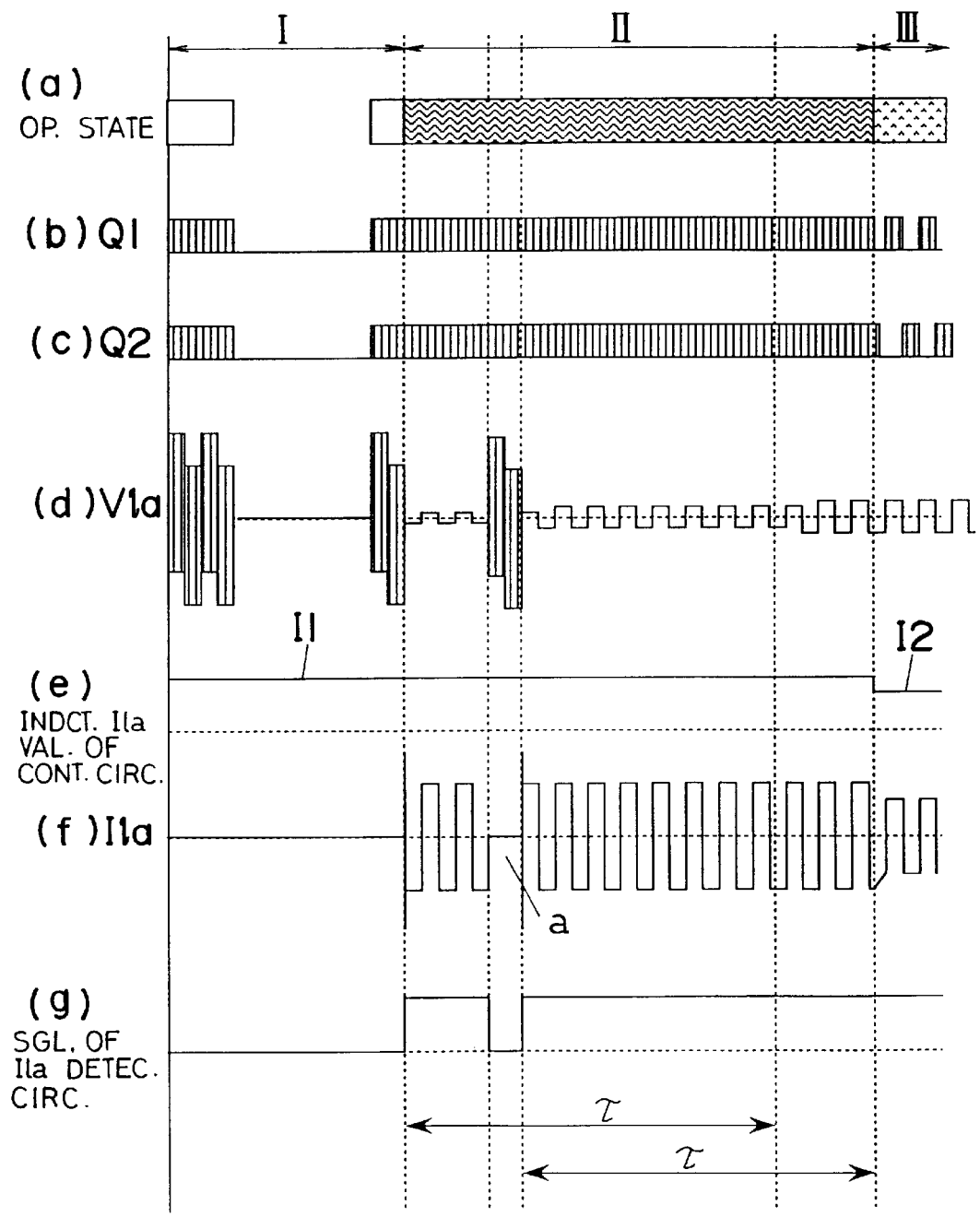
FIG. 20 is a timing chart for explaining the operation of a fifteenth embodiment of the present invention.

FIG. 20 is a waveform diagram for explaining the operation of a device in accordance with a fourteenth embodiment. The present device is substantially the same in arrangement as the circuit of the thirteenth embodiment in that the control circuit 5A stops the intermittent start-voltage applying means immediately after the start of the lamp, continues the start of the lamp and increases the lamp current, but is different from the thirteenth embodiment in the operation after the lamp starts, which follows.

In a no-load state operation duration (I) shown in FIG. 20(a), assuming now that such a high voltage based on a resonance voltage in the no-load state as shown by FIG. 20(d) causes the discharge lamp La to undergo dielectric breakdown and to start, then an energy is supplied from the D.C. power source circuit 1A to the discharge lamp La, so that such a lamp current Ila as shown by FIG. 20(f) starts to flow. When the lamp current detection circuit 52 detects a start of flowing of the lamp current Ila to detect the start of the discharge lamp La, the circuit 52 outputs such a detection signal as shown by FIG. 20(g) to the control circuit 5A. The circuit 5A when receiving the detection signal controls the switching elements Q1 and Q2 to perform switching operation similar to in the no load state as shown by FIGS. 20(b) and 20(c) in the constant duration τ, and stops the intermittent operation in the no-load state for the continuous operation. The control circuit 5A also controls the switching elements Q1 and Q2 in such a manner that the then lamp current Ila has a value I1 larger than a value I2 determined by signals of the lamp current and voltage detection circuits 52 and 51. Passage of the constant duration τ without any flickering out of the lamp causes the lamp to be shifted to the stationary operation.

In a no-load continuous operation duration (II) after dielectric breakdown, even if the discharge lamp La flickers out, no lamp current Ila flows as shown by "a" in FIG. 20(f), no detection signal is output from the lamp current detection circuit 52, the no-load operation continuously continued. For this reason, such a high resonance voltage as shown by FIG. 20(d) can be developed across the discharge lamp La and thus the discharge lamp La can be again started. In the present embodiment, the continuous no-load operation is repeated in the constant duration τ again from the start time point of the discharge lamp La, delaying the beginning of the no-load continuous operation duration (III).

As a result, the discharge lamp can be easily shifted from the unstable state immediately after the start of the discharge lamp La to the arc discharge state as the stable lighting state, thus realizing the reliable start of the lamp. In addition, after the dielectric breakdown of the discharge lamp La, the intermittent operation is stopped for the continuous operation, whereby the flickering out of the discharge lamp La caused by the intermittent oscillating operation can be prevented, thus realizing its improved startability.

Further, in the start duration, even if the discharge lamp La flickers out, a starting voltage can be immediately applied to the lamp. Furthermore, even after the re-start, the discharge lamp can continue the no-load continuous operation for a time duration sufficient for the lamp to be able to be shifted to the stable lighting state, and thus the lamp can be started more reliably.

What is claimed is:

1. A discharge lamp lighting device comprising:
    a D.C. power source circuit having a pair of output terminals for supplying a D.C. power;
    a polarity inverting circuit including a series circuit of at least first and second switching elements connected in parallel with the output terminals of the D.C. power source circuit for converting the D.C. power received from the D.C. power source circuit into an A.C. power;

a load resonance circuit including a first inductor, a first capacitor and a discharge lamp as a load for receiving the A.C. power from the polarity inverting circuit; and control means for alternately turning ON and OFF the first and second switching elements of the polarity inverting circuit to control a voltage to be applied to the discharge lamp of the load resonance circuit;

wherein the control means alternately turns ON and OFF the first and second switching elements at a high ON/OFF frequency so as to alternately provide a first period during which an ON duration of the second switching element is longer than that of the first switching element and a second period during which the ON duration of the second switching element is shorter than that of the first switching element to thereby apply a low frequency voltage of a rectangular waveform to the discharge lamp, superimposes a D.C. component upon resonance pulse signal received from the load resonance circuit in an ignition mode of the discharge lamp, and continuously changes a switching frequency of the switching elements to apply a high voltage to the discharge lamp.

2. The device according to claim 1, wherein the control means changes the switching frequency of the first and second switching elements for a predetermined time starting from a start time point of at least one of the first and second periods.

3. The device according to claim 1, wherein the control means changes the switching frequency of the first and second switching elements by a plurality of times in at least one of the first and second periods.

4. The device according to claim 1, wherein the control means changes the switching frequency of the first and second switching elements to any one of high and low frequencies in at least one of the first and second periods.

5. The device according to claim 2, wherein the control means changes the switching frequency of the first and second switching elements to any one of high and low frequencies in at least one of the first and second periods.

6. The device according to claim 1, wherein the control means changes the switching frequency of the first and second switching elements to the low frequency in at least one of the first and second periods.

7. The device according to claim 2, wherein the control means changes the switching frequency of the first and second switching elements to the low frequency in at least one of the first and second periods.

8. The device according to claim 1, wherein the polarity inverting circuit includes a series circuit of second and third capacitors connected in parallel with the first and second switching elements, the first and second switching elements being connected in the form of a half bridge.

9. The device according to claim 1, wherein the polarity inverting circuit includes a series circuit of third and fourth switching elements connected in parallel with the first and second switching elements, the first to fourth switching elements being connected in the form of a full bridge.

10. The device according to claim 1, wherein the inductor and capacitor of the load resonance circuit form a series resonance circuit of the inductor and capacitor connected in series.

11. The device according to claim 1, wherein the load resonance circuit is a double LC resonance circuit which includes two inductors and two capacitors.

12. The device according to claim 1, wherein the polarity inverting circuit includes a series circuit of second and third capacitors connected in parallel with the first and second switching elements, the first and second switching elements are connected in the form of a half bridge, and the control means changes the switching frequency of the first and second switching elements in at least one of the first and second periods.

13. The device according to claim 1, wherein the D.C. power source circuit includes means for converting the A.C. power received from an A.C. power source to the D.C. power, and the converting means has an arrangement of utilizing the first and second switching elements of the polarity inverting circuit.

14. The device according to claim 1, wherein a discharge lamp of the load resonance circuit is a high-intensity discharge lamp, the polarity inverting circuit includes intermittent oscillating means for intermittently performing the high frequency switching operation of the first and second switching elements, the control means includes lighting-state judging means for judging a lit state of the high-intensity discharge lamp, and the control means controls at least the intermittent oscillating means of at least the polarity inverting circuit for a predetermined duration after judgment of the lit state of the high-intensity discharge lamp by the lighting-state judging means to stably light the high-intensity discharge lamp.

15. The device according to claim 14, wherein the control means maintains the high-intensity discharge lamp in a lit state with a current larger than a predetermined current value to be sent to the discharge lamp at the time of initial lighting for the predetermined duration after the judgment of the lit state of the discharge lamp by the lighting-state judging means.

16. The device according to claim 14, wherein the control means maintains the lit state of the high-intensity discharge lamp with the load resonance circuit activated for the predetermined duration after the judgment of the lit state of the discharge lamp by the lighting-state judging means.

17. The device according to claim 14, wherein the control means inhibits operation of the intermittent oscillating means even when the lighting-state judging means judges a not-lit state of the high-intensity discharge lamp by the lighting-state judging means in the predetermined duration after the judgment of the lit state of the discharge lamp by the lighting-state judging means, and continues application of a voltage to the discharge lamp to keep starting operation of the load resonance circuit.

18. The device according to claim 14, wherein the control means inhibits operation of the intermittent oscillating means even when the lighting-state judging means judges a not-lit state of the high-intensity discharge lamp by the lighting-state judging means in the predetermined duration after the judgment of the lit state of the discharge lamp by the lighting-state judging means, continues application of a voltage to the discharge lamp to keep starting operation of the load resonance circuit, and supplies to the discharge lamp a current larger than a predetermined value to be supplied to the discharge lamp at the time of initial lighting.

19. The device according to claim 14, wherein the control means further includes lamp current detecting means and lamp voltage detecting means, the lamp current detecting means detects a current flowing from the D.C. power source circuit when the high-intention discharge lamp undergoes dielectric breakdown and ignites with a resonance voltage of the load circuit in a no-load state, the control means continues operation of the first and second switching elements of the polarity inverting circuit for the predetermined duration according to the detection, signal detected by the lamp current detecting means, stops operation of the intermittent oscillating means to continue the igniting operation, and controls the operation of the first and second switching elements to pass through the discharge lamp a lamp current of a value larger than a current determined by the detection signals of the lamp current detecting means and lamp voltage detecting means.

20. The device according to claim 1, wherein the D.C. power source circuit includes a rectifier connected in parallel with an A.C. power source, a second capacitor connected in parallel with output terminals of the rectifier, a second inductor connected at its one end to a high-potential output terminal of the rectifier, a first diode connected at its anode to the other end of the second inductor, a third switching element connected to the other end of the second inductor and to a low-potential output terminal of the rectifier, and a third capacitor connected to a cathode of the first diode and to the low potential output terminal of the rectifier; the polarity inverting circuit is a full bridge circuit including the series circuit of the first and second switching elements and a series circuit of fourth and fifth switching elements, both series circuits of the respective switching elements being connected in parallel with output terminals of the D.C. power source circuit; the load resonance circuit includes a series circuit of the first inductor and the first capacitor and connected between a node of the first and second switching elements and a node of the fourth and fifth switching elements, and also includes the discharge lamp connected in parallel with the first capacitor; and the control means includes a first control circuit for performing ON/OFF control over the third switching element in response to an output of the D.C. power source circuit and a second control circuit for performing ON/OFF control over the first, second, fourth and fifth switching elements in response to detection signals obtained by detecting a current and voltage supplied to the discharge lamp.

21. The device according to claim 1, wherein the polarity inverting circuit further includes a series circuit of second and third capacitors connected in parallel with the output terminals of the D.C. power source circuit, and the load resonance circuit includes a first resonance circuit comprising a series circuit of the first inductor and first capacitor, the first capacitor being connected at one end with a node of the second and third capacitors, the first inductor being connected at the other end with a node of said first and second switching elements, and a second resonance circuit comprising a series circuit of a second capacitor connected across said first resonance circuit and a second inductor connected between the other end of the first inductor of the first resonance circuit and the node of the first and second switching elements, the discharge lamp being connected across the first capacitor of the first circuit.

22. The device according to claim 1, wherein the load resonance circuit comprises a double LC resonance circuit including the first inductor and first capacitor forming a series circuit connected between a node of the first and second switching elements and a node of the polarity inverting circuit, a second capacitor connected in parallel with the first inductor and first capacitor, a second inductor inserted between the node of the first and second switching elements and a node of the first inductor and second capacitor, and the discharge lamp connected in parallel with the first capacitor; and the polarity inverting circuit includes a series circuit of third and fourth capacitors connected in parallel with the first and second switching elements.

23. The device according to claim 1, wherein the D.C. power source circuit includes a rectifier connected in parallel with an A.C. power source and a boosting chopper circuit connected in parallel with the rectifier, the boosting chopper circuit having a second inductor connected at its one end to a high-potential output terminal of the rectifier, a first diode connected at its anode to the other end of the second inductor, a third switching element connected to the other end of the second inductor and to a low potential output terminal of the rectifier, and a parasitic diode connected in parallel with the third switching element; the polarity inverting circuit includes a series circuit of a second diode, the first switching element, a third diode and the second switching element, the series circuit being connected in parallel with the output terminal of the D.C. power source circuit, a fourth diode connected in parallel with the second diode and first switching element, a fifth diode connected in parallel with the third diode and second switching element, a series circuit of second and third capacitors connected in parallel with the output terminals of the D.C. power source circuit, the load resonance circuit includes a series circuit of the first inductor and first capacitor connected between a node or the first switching element and third diode, a node between the fourth and fifth diode and a node of the second and third capacitors in the polarity inverting circuit, and the discharge lamp connected in parallel with the first capacitor; and the control means includes a first control circuit for detecting an output voltage of the boosting chopper circuit and performing ON/OFF control over the third switching element to boost an output voltage of the rectifier to a predetermined level, and a second control circuit for performing ON/OFF control over the first and second switching elements on the basis of a discharge lamp power obtained by detecting a current and voltage supplied to the discharge lamp.

* * * * *